United States Patent
Meng

(10) Patent No.: US 12,174,746 B2
(45) Date of Patent: Dec. 24, 2024

(54) DATA PROCESSING METHOD AND CHIP, DEVICE, AND STORAGE MEDIUM

(71) Applicant: TENCENT TECHNOLOGY (SHENZHEN) COMPANY LIMITED, Guangdong (CN)

(72) Inventor: Yu Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 330 days.

(21) Appl. No.: 17/502,218

(22) Filed: Oct. 15, 2021

(65) Prior Publication Data

US 2022/0035745 A1 Feb. 3, 2022

Related U.S. Application Data

(63) Continuation of application No. PCT/CN2020/118893, filed on Sep. 29, 2020.

(30) Foreign Application Priority Data

Dec. 5, 2019 (CN) .......................... 201911235760.X

(51) Int. Cl.
G06F 12/0875 (2016.01)
G06N 3/04 (2023.01)

(52) U.S. Cl.
CPC ............ G06F 12/0875 (2013.01); G06N 3/04 (2013.01); *G06F 2212/608* (2013.01)

(58) Field of Classification Search
CPC ........... G06F 12/0875; G06F 2212/608; G06F 2212/1016; G06F 2212/452;
(Continued)

(56) References Cited

U.S. PATENT DOCUMENTS

| 6,401,187 B1* | 6/2002 | Motokawa | ............ G06F 8/4442 |
| | | | 711/138 |
| 2004/0184528 A1* | 9/2004 | Miyasaka | ........ G08B 13/19645 |
| | | | 348/149 |

(Continued)

FOREIGN PATENT DOCUMENTS

| CN | 105205012 A | 12/2015 |
| CN | 105868121 A | 8/2016 |

(Continued)

OTHER PUBLICATIONS

International Search Report for PCT/CN2020/118893 dated Dec. 31, 2020. [PCT/ISA/210].

(Continued)

*Primary Examiner* — Charles Rones
*Assistant Examiner* — Jonah C Krieger
(74) *Attorney, Agent, or Firm* — Sughrue Mion, PLLC

(57) ABSTRACT

A data processing method, device, and storage medium that reads a parallel control code; reads, according to the parallel control code, first data that has been cached in a data cache space, processes the read first data, and outputs the processed first data to the data cache space; and simultaneously moves second data from a data storage space to the data cache space according to the parallel control code, the second data being the next data of the first data. Data processing and data moving are performed simultaneously according to the parallel control code, to reduce a duration of the data processing waiting for the data moving, thereby improving a processing speed and processing efficiency.

20 Claims, 12 Drawing Sheets

(58) Field of Classification Search
CPC ... G06F 2212/454; G06F 9/3885; G06N 3/04; G06N 3/045; G06N 3/063; Y02D 10/00
See application file for complete search history.

(56) References Cited

U.S. PATENT DOCUMENTS

| | | | |
|---|---|---|---|
| 2010/0049905 A1* | 2/2010 | Ouchi | G06F 3/0625 |
| | | | 713/340 |
| 2017/0046081 A1* | 2/2017 | Palmer | G06F 3/065 |
| 2017/0132140 A1* | 5/2017 | Lin | G06F 9/3455 |
| 2018/0189635 A1* | 7/2018 | Olarig | G06F 16/583 |
| 2020/0019321 A1* | 1/2020 | Dronamraju | G06F 12/0868 |
| 2022/0129302 A1* | 4/2022 | Yuan | G06N 3/063 |
| 2022/0276851 A1* | 9/2022 | Nakahara | G07C 5/085 |

FOREIGN PATENT DOCUMENTS

| | | |
|---|---|---|
| CN | 107728939 A | 2/2018 |
| CN | 108334474 A | 7/2018 |
| CN | 109219805 A | 1/2019 |
| CN | 111045732 A | 4/2020 |

OTHER PUBLICATIONS

Written Opinion for PCT/CN2020/118893 dated Dec. 31, 2020. [PCT/ISA/237].

* cited by examiner

| Parallel control instruction | 1 | 2 | 3 | 4 | 5 | 6 | 7 | 8 |
|---|---|---|---|---|---|---|---|---|
| | Data moving unit (first data A) | Data moving unit (second data B) | Data moving unit (third data C) | Data moving unit (fourth data D) | Data moving unit (fifth data E) | Data moving unit (sixth data F) | | |
| | | Data processing unit (first data A) | Data processing unit (second data B) | Data processing unit (third data C) | Data processing unit (fourth data D) | Data processing unit (fifth data E) | Data processing unit (sixth data F) | |
| | | | Moving unit (processed first data A) | Moving unit (processed second data B) | Moving unit (processed third data C) | Moving unit (processed fourth data D) | Moving unit (processed fifth data E) | Moving unit (processed sixth data F) |

FIG. 9

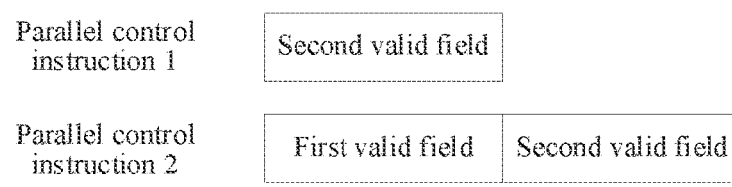

FIG. 10

| Valid field indication information | First valid field | Second valid field | Third valid field | Fourth field | Fifth field | Sixth field |
|---|---|---|---|---|---|---|

FIG. 11

| Parallel control instruction | 1 | 2 | 3 | 4 | 5 | 6 | 7 | 8 |
|---|---|---|---|---|---|---|---|---|
| | Load moving subunit (tile data Tile 1) | Load moving subunit (Tile2) | Load moving subunit (Tile3) | Load moving subunit (Tile4) | Load moving subunit (Tile5) | Load moving subunit (Tile6) | | |
| | | Convolution processing subunit (Tile1) | Convolution processing subunit (Tile2) | Convolution processing subunit (Tile3) | Convolution processing subunit (Tile4) | Convolution processing subunit (Tile5) | Convolution processing subunit (Tile6) | |
| | | | Store moving subunit (Tile1) | Store moving subunit (Tile2) | Store moving subunit (Tile3) | Store moving subunit (Tile4) | Store moving subunit (Tile5) | Store moving subunit (Tile6) |

FIG. 16

| Parallel control instruction | 1 | 2 | 3 | 4 | 5 | 6 | 7 | 8 | 9 | 10 |
|---|---|---|---|---|---|---|---|---|---|---|
| | Load moving subunit (Tile 1) | Load moving subunit (Tile2) | Load moving subunit (Tile3) | Load moving subunit (Tile4) | Load moving subunit (Tile5) | Load moving subunit (Tile6) | | | | |
| | | Convolution processing subunit (Tile1) | Convolution processing subunit (Tile2) | Convolution processing subunit (Tile3) | Convolution processing subunit (Tile4) | Convolution processing subunit (Tile5) | Convolution processing subunit (Tile6) | | | |
| | | | Move moving subunit (Tile1) | Move moving subunit (Tile2) | Move moving subunit (Tile3) | Move moving subunit (Tile4) | Move moving subunit (Tile5) | Move moving subunit (Tile6) | | |
| | | | | Pooling processing subunit (Tile1) | Pooling processing subunit (Tile2) | Pooling processing subunit (Tile3) | Pooling processing subunit (Tile4) | Pooling processing subunit (Tile5) | Pooling processing subunit (Tile6) | |
| | | | | | Store moving subunit (Tile1) | Store moving subunit (Tile2) | Store moving subunit (Tile3) | Store moving subunit (Tile4) | Store moving subunit (Tile5) | Store moving subunit (Tile6) |

FIG. 17

DATA PROCESSING METHOD AND CHIP, DEVICE, AND STORAGE MEDIUM

CROSS-REFERENCE TO RELATED APPLICATION(S)

This application is a continuation application of International Application No. PCT/CN2020/118893, filed on Sep. 29, 2020, which claims priority to Chinese Patent Application No. 201911235760.X, filed with the China National Intellectual Property Administration on Dec. 5, 2019, the disclosures of which are incorporated by reference in their entireties.

FIELD

The disclosure relates to the field of computer technologies, and in particular, to a data processing method and chip, a device, and a storage medium.

BACKGROUND

A processor in a computer device may process a large quantity of calculation tasks. For example, a data moving unit in the processor moves picture data from outside the processor into the processor, and a processing unit in the processor processes the picture data.

Currently, with the development of the computer device and continuous improvement of processing performance, data becomes larger, a data moving process is relatively time-consuming, and a data processing process depends on the data moving process, resulting in a relatively slow processing speed and a relatively low processing efficiency of the processor.

SUMMARY

Embodiments of the disclosure may provide a data processing method and chip, a device, and a storage medium, which can improve processing efficiency. The technical solutions are as follows.

According to an aspect, an embodiment of the disclosure may provide a data processing method, applicable to a computer device, the method including:
  reading a parallel control code;
  reading, according to the parallel control code, first data that has been cached in a data cache space, processing the read first data, and outputting processed first data to the data cache space; and
  moving second data from a data storage space to the data cache space according to the parallel control code, the second data being next data of the first data.

According to another aspect, an embodiment of the disclosure may provide a data processing chip or device, including: an instruction processing unit, a data processing unit, a data moving unit, and a data cache unit,
  the instruction processing unit being configured to read a parallel control code, and simultaneously transmit the parallel control code to the data processing unit and the data moving unit;
  the data processing unit is configured to read, according to the parallel control code, first data that has been cached in the data cache unit, process the read first data, and output processed first data to the data cache unit; and
  the data moving unit being configured to simultaneously move, according to the parallel control code, second data from a data storage unit located outside the chip to the data cache, the second data being next data of the first data.

In an example embodiment, the data processing unit may include at least one of a convolutional engine or a pooling engine.

According to another aspect of the disclosure, a computer device is provided, including a processor and a data storage unit, the processor including an instruction processing unit, a data processing unit, a data moving unit, and a data cache unit;
  the instruction processing unit being configured to read a parallel control code;
  the data processing unit being configured to read, according to the parallel control code, first data that has been cached in the data cache unit, process the read first data, and output processed first data to the data cache unit; and
  the data moving unit being configured to simultaneously move second data from the data storage unit to the data cache unit according to the parallel control code, the second data being next data of the first data.

In an example embodiment, the computer device may include an instruction storage unit, the processor may include an instruction cache unit, and the instruction processing unit is configured to read parallel control code in the instruction storage unit; move the read parallel control code to the instruction cache unit according to a reading sequence for caching, to obtain an instruction cache queue; and read the parallel control code from the instruction cache queue according to an instruction cache sequence.

In a possible implementation, the parallel control instruction includes a data processing code and a data moving code; and the instruction processing unit is configured to extract the data processing instruction and the data moving instruction in the parallel control instruction;
  the instruction processing unit is further configured to transmit the data processing code to the data processing unit and simultaneously transmit the data moving code to the data moving unit;
  the data processing unit is configured to read, according to the data processing code, the first data that has been cached in the data cache unit, process the read first data, and output the processed first data to the data cache unit; and
  the data moving unit is configured to move the second data from the data storage unit to the data cache unit according to the data moving code.

In an example embodiment, the instruction processing unit may be configured to extract valid field indication information in the parallel control code, and determine a first valid field and a second valid field in the parallel control code according to the valid field indication information; and read the first valid field in the parallel control code, to obtain the data processing code, and read the second valid field in the parallel control code, to obtain the data moving code.

In an example embodiment, the computer device may further include a splitting unit, the splitting unit being configured to obtain to-be-processed data; split the to-be-processed data according to a cache capacity of the data cache unit, to obtain a plurality of pieces of split data; and store a data sequence formed by the plurality of pieces of data in the data storage unit.

In an example embodiment, the to-be-processed data may be picture data; and the data processing unit may be configured to read, according to the parallel control code based on a neural network model, the first data that has been cached in the data cache, process the read first data, and output the processed first data to the data cache.

In an example embodiment, the data processing unit may be configured to perform data processing in parallel according to a data processing code corresponding to each layer in the neural network model.

In an example embodiment, the neural network model may include a convolutional layer and a pooling layer, and the data processing unit is configured to:

receive a data processing instruction corresponding to the convolutional layer and a data processing code corresponding to the pooling layer;

read, according to the data processing instruction corresponding to the convolutional layer based on the convolutional layer, the first data that has been cached in the data cache unit, perform convolution processing on the first data, and output the first data after the convolution processing to the data cache unit; and simultaneously read, according to the data processing instruction corresponding to the pooling layer based on the pooling layer, third data after the convolution processing that has been cached in the data cache unit, perform pooling processing on the third data after the convolution processing, and output the third data after the pooling processing to the data cache unit, the third data being previous data of the first data in the plurality of pieces of data.

According to another aspect, an embodiment of the disclosure may provide a computer-readable storage medium, storing at least one program code, where the at least one program code is loaded and executed by a processor to implement an operation performed in the data processing method.

The technical solutions provided in the embodiments of the disclosure achieve at least the following beneficial effects:

A parallel control code is read, and a data processing operation and a data moving operation are simultaneously performed according to the parallel control code, to reduce a duration of which the data processing operation waits for the data moving operation as much as possible, thereby improving a data processing speed and data processing efficiency. In addition, processed data is data that has been moved to a data storage space, and can be processed without waiting for the data moving process, thereby reducing dependence of the data processing process on the data moving processing and improving a processing speed and processing efficiency.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 9 is a flowchart of a data processing method according to an example embodiment of the disclosure.

FIG. 10 is a schematic diagram of a control instruction according to an example embodiment of the disclosure.

FIG. 11 is a schematic diagram of a control instruction according to an example embodiment of the disclosure.

FIG. 16 is a flowchart of a data processing method according to an example embodiment of the disclosure.

FIG. 17 is a flowchart of a data processing method according to an example embodiment of the disclosure.

DESCRIPTION OF EMBODIMENTS

Figure 1:
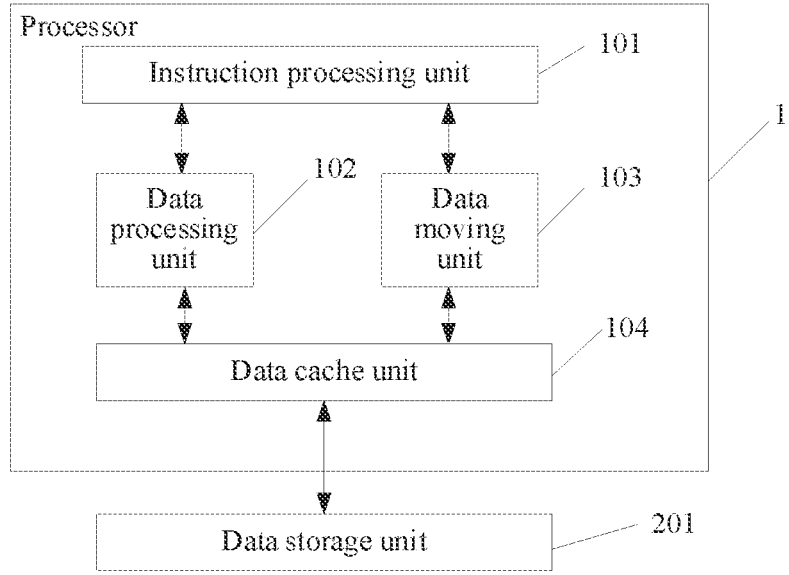
FIG. 1 is a schematic diagram of a computer device according to an example embodiment of the disclosure.

To make the objectives, technical solutions, and advantages of the disclosure clearer, implementations of the disclosure are further described in detail with reference to the accompanying drawings.

It can be understood that the terms "first", "second", and the like used in the disclosure may be used for describing various concepts in this specification. However, the concepts are not limited by the terms unless otherwise specified. The terms are merely used for distinguishing one concept from another concept. For example, without departing from the scope of the disclosure, first data is referred to as second data, and similarly, the second data is referred to as the first data.

For the terms "at least one". "a plurality of", "each", and "any" used in the disclosure, "at least one" includes one, two, or more, "a plurality of" includes two or more, "each" refers to each of "a plurality of corresponding ones", and "any" refers to any one of "a plurality of ones". For example, a plurality of units include three units, "each" refers to each of the three units, and "any" refers to any one of the three units, which may be the first one, the second one, or the third one.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand essence of intelligence and produces a new intelligent machine that can respond in a manner similar to human intelligence. The role of AI is to study the design principles and implementation methods of various intelligent machines, to enable the machines to have the functions of perception, reasoning, and decision-making.

The AI technology is a comprehensive discipline and relates to a wide range of fields including hardware-level technology and software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

In an example embodiment of the disclosure, data processing can be performed by using the AI technology, and a processing speed and processing efficiency are improved by using a data processing method provided in the disclosure. The data processing method of the disclosure is described in detail in the following embodiments.

For example, the data processing method provided in this embodiment of the disclosure is applicable to a computer device. The computer device includes electronic products such as a mobile phone, a tablet computer, an intelligent terminal, a robot, a computer, a printer, a scanner, a telephone, an event data recorder, a navigator, a camera, a camera, a watch, an earphone, and a wearable device; or includes transport vehicles such as an airplane, a ship, and a vehicle; or includes household appliances such as a television, an air conditioner, a microwave oven, a refrigerator, an electric cooker, a humidifier, a washing machine, an electric lamp, a gas stove, and a range hood; or includes medical devices such as a nuclear magnetic resonance instrument and an electrocardiograph; or includes a server. For example, the computer device is a server, or is a server cluster formed by a plurality of servers, or is a cloud computing service center.

In an example embodiment of the disclosure, the data processing method is applicable to a electrocardiograph.

The electrocardiograph photographs an electrocardiogram image of a user, the obtained electrocardiogram image is analyzed by using a trained neural network, and whether the user has a heart problem can be determined. By using the data processing method provided in this embodiment of the disclosure, after the electrocardiogram image is obtained, an operation step that needs to be performed by the neural network is performed by using a processor. An instruction processing unit in the processor simultaneously transmits a control instruction to a data processing unit and a data moving unit, and the data processing unit and the data moving unit run in parallel, that is, a process of moving the electrocardiogram image to the processor and a process of processing a previous electrocardiogram image moved to the processor are performed simultaneously to, as much as possible, prevent the data processing unit from having to wait for the data moving unit to move the electrocardiogram image, thereby improving a processing speed and processing efficiency.

The data processing method provided in the embodiments of the disclosure is applicable to any scenario of processing data. This is not limited in the embodiments of the disclosure.

As shown in FIG. 1, the computer device includes a processor 1 and a data storage unit 201. The processor 1 includes an instruction processing unit 101, a data processing unit 102, a data moving unit 103, and a data cache unit 104. The instruction processing unit 101 is respectively connected to the data processing unit 102 and the data moving unit 103, the data cache unit 104 is respectively connected to the data processing unit 102 and the data moving unit 103, and the data storage unit 201 is respectively connected to the data processing unit 102 and the data cache unit 104. The instruction processing unit 101 can simultaneously transmits a control instruction to the data processing unit 102 and the data moving unit 103. The data storage unit 201 can store a plurality of pieces of data.

Figure 2:
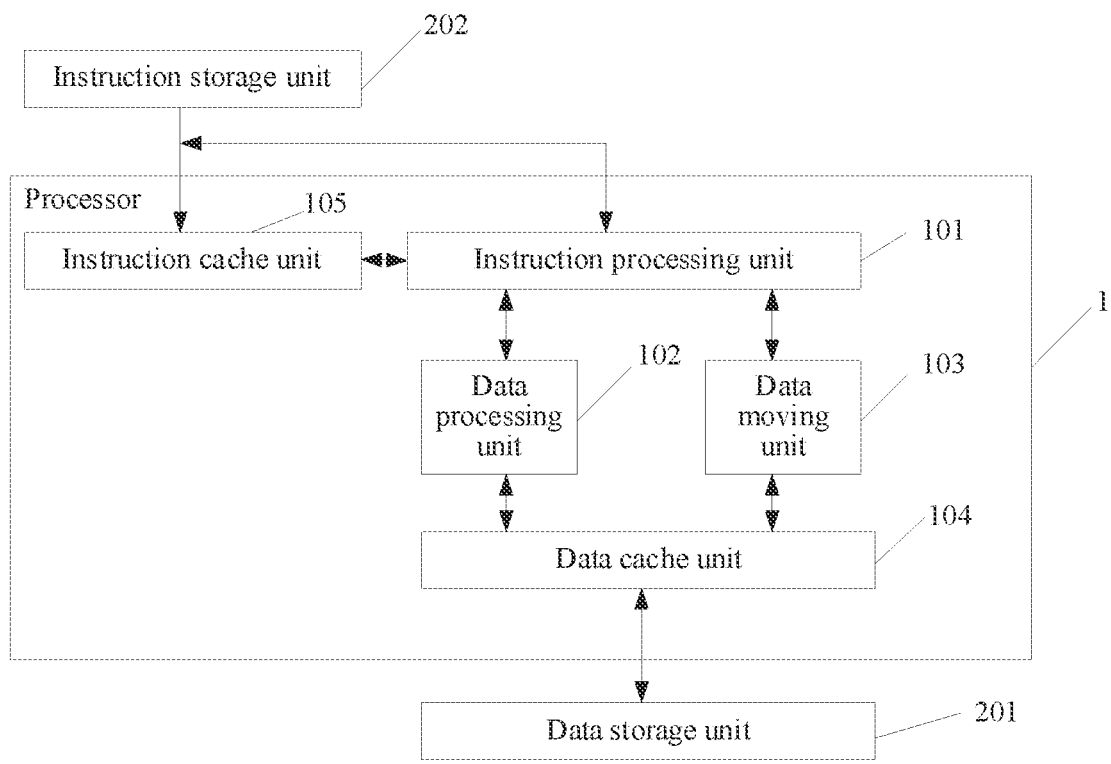
FIG. 2 is a schematic diagram of another computer device according to an example embodiment of the disclosure.

In another example embodiment, as shown in FIG. 2, the computer device further includes an instruction storage unit 202, the processor 1 further includes an instruction cache unit 105, and the instruction processing unit 101 is configured to move at least one control instruction stored in the instruction storage unit 202 to the instruction cache unit 105.

Figure 3:
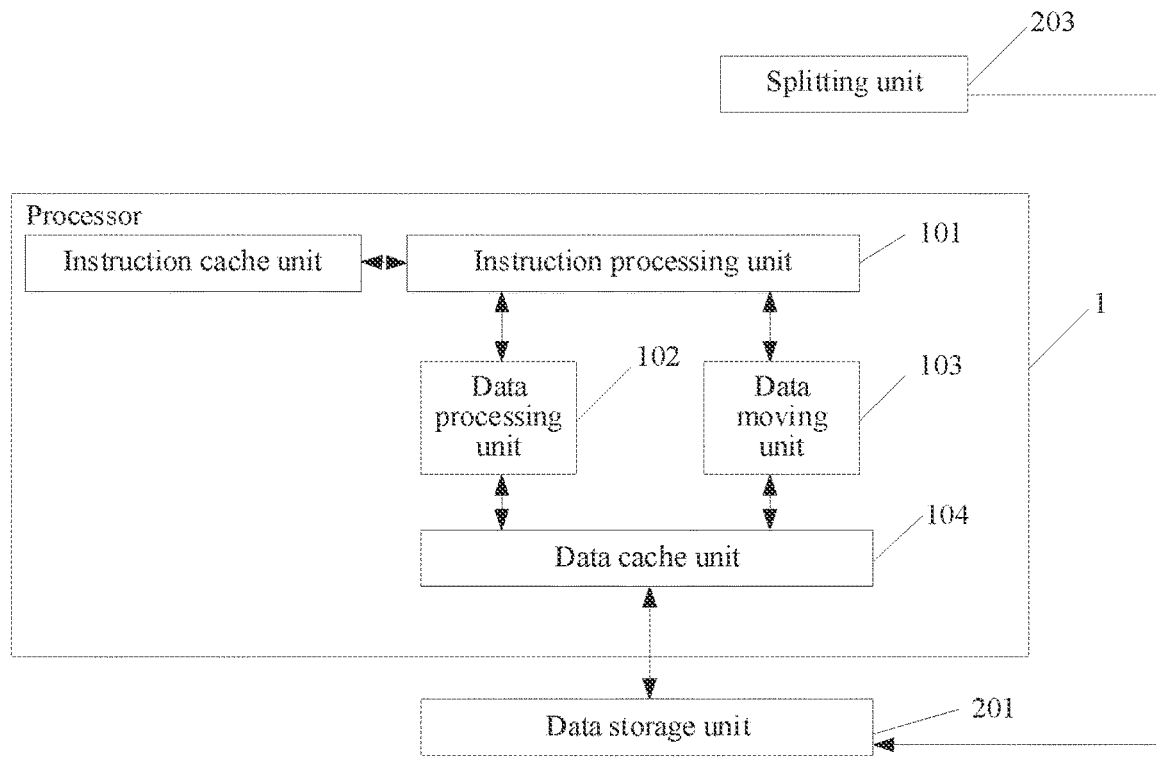
FIG. 3 is a schematic diagram of another computer device according to an example embodiment of the disclosure.

In another example embodiment, as shown in FIG. 3, the computer device further includes a splitting unit 203. The splitting unit is located outside the processor 1 and can split to-be-processed data into a plurality of pieces of data and can further store the plurality of pieces of split data in the data storage unit 201.

Figure 4:
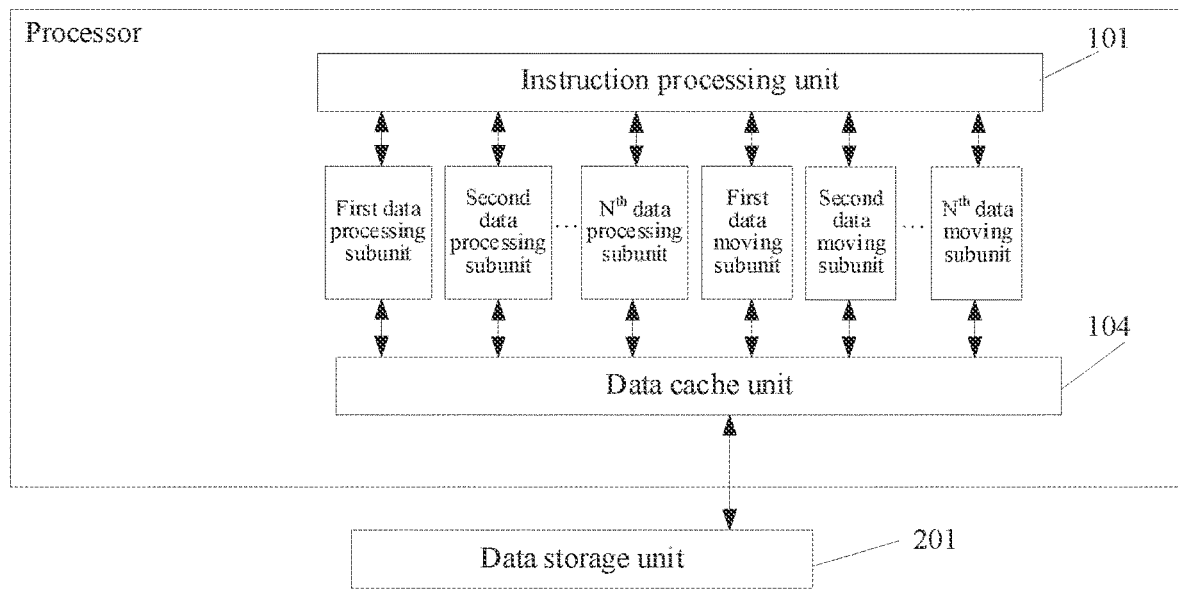
FIG. 4 is a schematic diagram of another computer device according to an example embodiment of the disclosure.

In another example embodiment, as shown in FIG. 4, the data processing unit 102 includes at least one data processing subunit, and each data processing subunit is configured to process data differently. The data moving unit 103 may include at least one data moving subunit, and the data moving processes of the data moving subunits are different. An embodiment in which the data moving unit includes three data moving subunits is used as an example for description. A first data moving subunit is configured to move data from the data storage unit 201 to the data cache unit 104; a second data moving subunit is configured to move data from the data cache unit 104 to the data storage unit 201, and a third data moving subunit is configured to move data from a first position of the data cache unit 104 to a second position of the data cache unit 104. The data processing subunit may be a compute engine such as a convolutional engine or a pooling engine, and the data moving subunit may be a move engine such as a load engine, a store engine, or a move engine.

Figure 5:
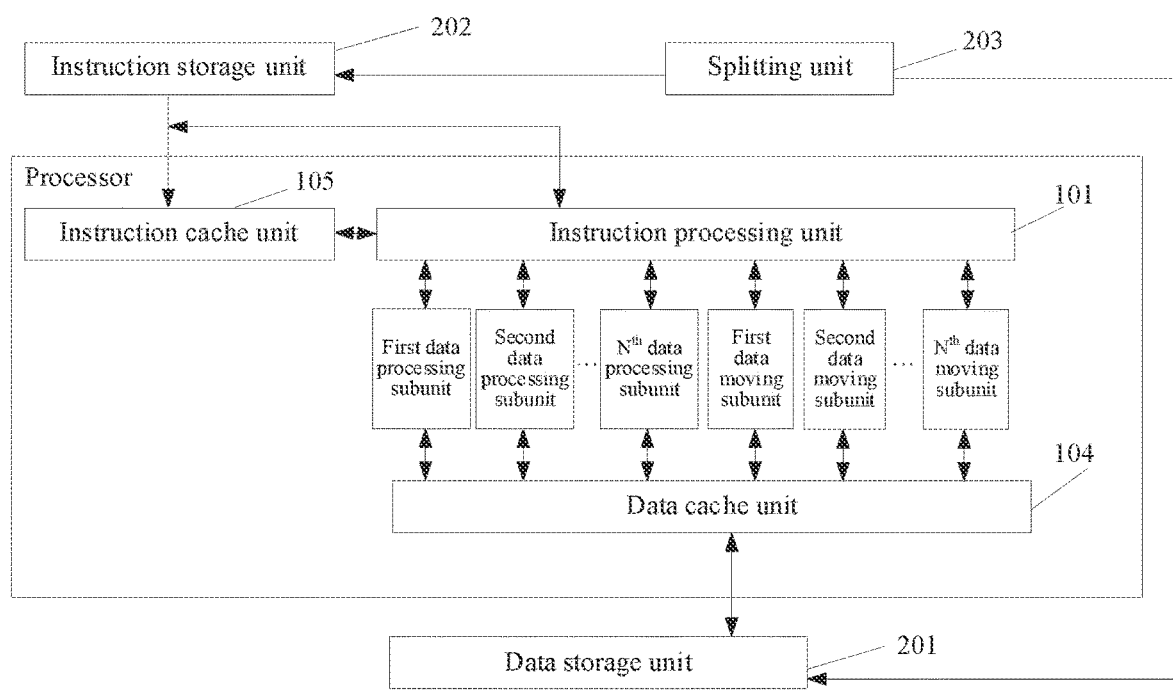
FIG. 5 is a schematic diagram of another computer device according to an example embodiment of the disclosure.

For example, as shown in FIG. 5, the computer device includes the instruction processing unit 101, the data processing unit 102, the data moving unit 103, the data cache unit 104, the instruction cache unit 105, the data storage unit 201, the instruction storage unit 202, and the splitting unit 203. The data processing unit 102 includes at least one data processing subunit, and the data moving unit includes at least one data moving subunit.

Figure 6:
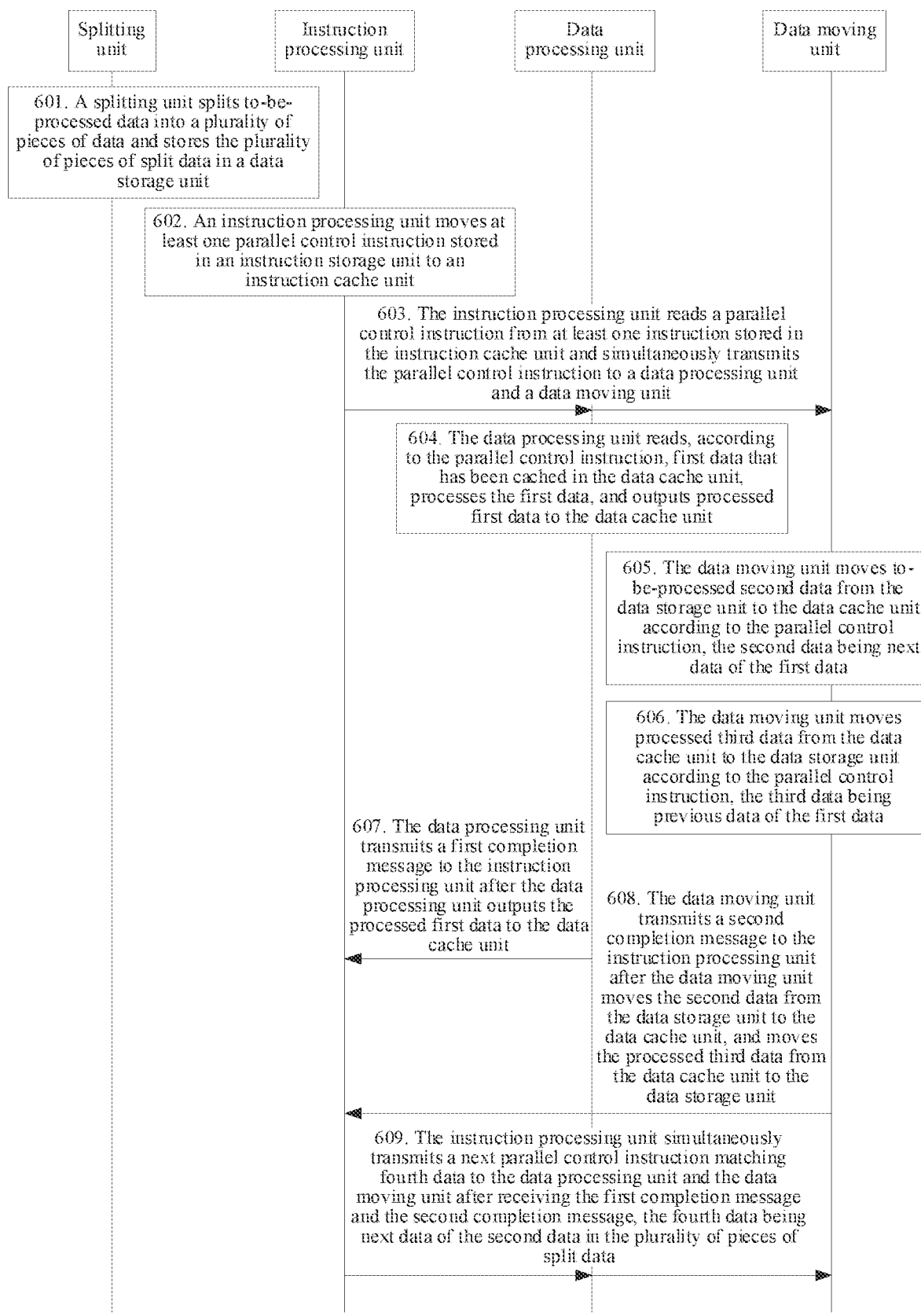
FIG. 6 is a flowchart of a data processing method according to an example embodiment of the disclosure.

FIG. 6 is a flowchart of a data processing method according to an embodiment of the disclosure. The execution body of this embodiment of the disclosure is the computer device shown in any one of FIG. 1 to FIG. 5. Referring to FIG. 6, the method includes the following operations.

601. A splitting unit splits to-be-processed data into a plurality of pieces of data and stores the plurality of pieces of split data in a data storage unit.

To-be-processed data is data that needs to be processed by a processor. For example, the to-be-processed data may include data of any one or more forms such as picture data, audio data, and text data. The to-be-processed data is not limited in this embodiment of the disclosure.

If a data volume of the to-be-processed data is relatively large, a process of moving the to-be-processed data is relatively time-consuming. Therefore, in this embodiment of the disclosure, the to-be-processed data is split into a plurality of pieces of data, and each data in the plurality of pieces of split data is processed. Ultimately the volume of data that is moved each time becomes smaller and thus the moving speed becomes faster.

In an example embodiment, the splitting, by a splitting unit, the to-be-processed data into a plurality of pieces of data includes: averagely splitting the to-be-processed data into the plurality of pieces of data according to a size of the to-be-processed data, if the to-be-processed data is picture data. For example, a size of the picture data is 128*128*3, and the picture data is split, to obtain 16 pieces of picture data with a size of 32*32*3.

In an example embodiment, the averagely splitting the to-be-processed data into the plurality of pieces of data refers to splitting the to-be-processed data according to a target quantity into a target quantity of pieces of data. For example, the target quantity is 100, and the to-be-processed data is averagely split into 100 pieces of data regardless of a size of the to-be-processed data.

In an example embodiment, the averagely splitting the to-be-processed data into the plurality of pieces of data refers to splitting the to-be-processed data according to a target size, to cause each split data to be not greater than the target size, so that the split data can be moved smoothly.

In an example embodiment, if the to-be-processed data is the audio data, the to-be-processed data is split according to a reference duration. For example, the to-be-processed data is audio data with a duration of one minute, and when the reference duration is 10 seconds, the to-be-processed data is split according to the reference duration, to obtain six pieces of audio data with a duration of 10 seconds. Alternatively, the to-be-processed data is split according to a sentence, and each obtained data in a plurality of pieces of data includes at least one sentence. For example, there is a particular time interval between two adjacent sentences. Therefore, a plurality of sentences in the to-be-processed data can be split according to segments that do not include voice data outputted by a target object in the to-be-processed data, to obtain a plurality of pieces of data, each data in the plurality of pieces of data including a sentence. In an embodiment, the target object may be a person or any other object that can input voice data in an environment.

In an example embodiment, if the to-be-processed data is the text data, the to-be-processed data is averagely split into a plurality of pieces of data according to a target data volume, and in the plurality of pieces of data, a data volume of each data does not exceed the target data volume; or the to-be-processed data is split into a plurality of pieces of data in a manner of splitting segments, sentences, or the like. For example, each segment of words in the to-be-processed data is split as one piece of data, to obtain a plurality of pieces of data; or each sentence in the to-be-processed data is split as one piece of data, to obtain a plurality of pieces of data.

Because the splitting unit splits the to-be-processed data into a plurality of pieces of data, and inputs the plurality of pieces of data into a processor, the processor processes the plurality of pieces of data sequentially. In an embodiment, the splitting unit splits the to-be-processed data according to configuration information of the processor. For example, the configuration information is a cache capacity of a data cache unit in the processor. The splitting unit obtains the to-be-processed data, and splits the to-be-processed data according to the cache capacity of the data cache unit, to obtain a plurality of pieces of split data, and a data volume of each data does not exceed the cache capacity. In an embodiment, the splitting unit splits the to-be-processed data into the plurality of pieces of data according to a splitting rule, the splitting rule indicating that a data volume of any data obtained by splitting is not greater than the cache capacity of the data cache unit. For example, the splitting rule is a rule specified according to the configuration information.

In an example embodiment, the configuration information of the processor is a processing amount of a data processing unit in the processor, or a bandwidth in the processor, or the like. For example, the configuration information includes one or more types of information.

In an example embodiment, the cache capacity of the data cache unit is a total cache capacity of the data cache unit. In an embodiment, the splitting, by the splitting unit, the to-be-processed data into the plurality of pieces of data according to a splitting rule includes: splitting, by the splitting unit, the to-be-processed data into the plurality of pieces of data according to the total cache capacity of the data cache unit, a data volume of each data being not greater than the total cache capacity of the data cache unit. For example, the total cache capacity of the data cache unit is 15 KB, and a data volume of the to-be-processed data is 85 KB. The to-be-processed data is split into six pieces of data with the same data volume, or the to-be-processed data is split into six pieces of data with different data volumes, for example, the data volumes of the six pieces of data are 15 KB, 15 KB, 15 KB, 15 KB, 15 KB, and 10 KB respectively.

In an example embodiment, the data cache unit may also need to cache other data in addition to caching data inputted into the processor. For example, the cache capacity of the data cache unit is a current remaining cache capacity of the data cache unit. In an example embodiment, the splitting, by the splitting unit, of the to-be-processed data into the plurality of pieces of data according to a splitting rule includes: splitting, by the splitting unit, the to-be-processed data into the plurality of pieces of data according to the remaining cache capacity of the data cache unit, a data volume of each data being not greater than the remaining cache capacity of the data cache unit.

In addition, the data cache unit can cache data that needs to be processed by the data processing unit and can further cache data after being outputted by the data processing unit. Moreover, in this embodiment of the disclosure, an instruction processing unit simultaneously transmits a parallel control instruction to the data processing unit and a data moving unit, so that when the data processing unit processes data that has been stored in the data cache unit, the data moving unit can move to-be-processed data to the data cache unit simultaneously. Therefore, the data cache unit needs to cache at least data to be moved by the data moving unit, data to be processed by the data processing unit, and data to be outputted by the data processing unit.

Therefore, in an embodiment, the splitting, by the splitting unit, the to-be-processed data into the plurality of pieces of data according to a splitting rule includes: splitting, by the splitting unit, the to-be-processed data into the plurality of pieces of data according to a data volume of inputted data of the data processing unit and a data volume of outputted data of the data processing unit, so that the data cache unit can cache at least two pieces of input data and one piece of output data of the data processing unit.

For example, the cache capacity of the data cache unit is 30 KB. If data with a data volume of 10 KB is inputted into the data processing unit, and after the data processing unit processes the data, the outputted data is also 10 KB. Therefore, the to-be-processed data is split into the plurality of pieces of data, and a data volume of each data does not exceed 10 KB.

In addition, when caching data, the data cache unit can store different types of data into different storage spaces, to facilitate distinguishing and management of the data. For example, data to be processed by the data processing unit is stored in a first storage space, and processed data is stored in a second storage space. In an example embodiment, the splitting, by the splitting unit, the to-be-processed data into the plurality of pieces of data according to a splitting rule includes: determining a maximum data volume of each data according to a size of the first storage space and a size of the second storage space, and splitting the to-be-processed data into the plurality of pieces of data, a data volume of each data being not greater than the maximum data volume. For example, the first storage space is an input storage space of the data processing unit, and the second storage space is an output storage space of the data processing unit.

For example, for data before and after being processed by the data processing unit, a data volume of the data may change. A capacity of the first storage space is 16 KB, and a capacity of the second storage space is 8 KB. It is assumed that, the data volume of the data after data processing is twice the data volume of the data before the processing, and if the second storage space can accommodate the processed data, a maximum data volume is 4 KB, and the data obtained after the splitting does not exceed 4 KB.

In another example embodiment, a capacity of the first storage space is 16 KB, and a capacity of the second storage space is 16 KB. Due to parallel execution of data processing and data moving, the first storage space needs to store data to be processed by the data processing unit and further needs to reserve a space for data to be moved by the data moving unit. Therefore, the first storage space needs to accommodate at least two pieces of data, and the data obtained after the splitting does not exceed 8 KB.

In an example embodiment, the processor is an AI chip used for performing calculation processes of a neural network model. An embodiment in which the data processing unit is a unit for performing a convolution operation is used as an example to describe how the to-be-processed data is split into the plurality of pieces of data.

Figure 7:
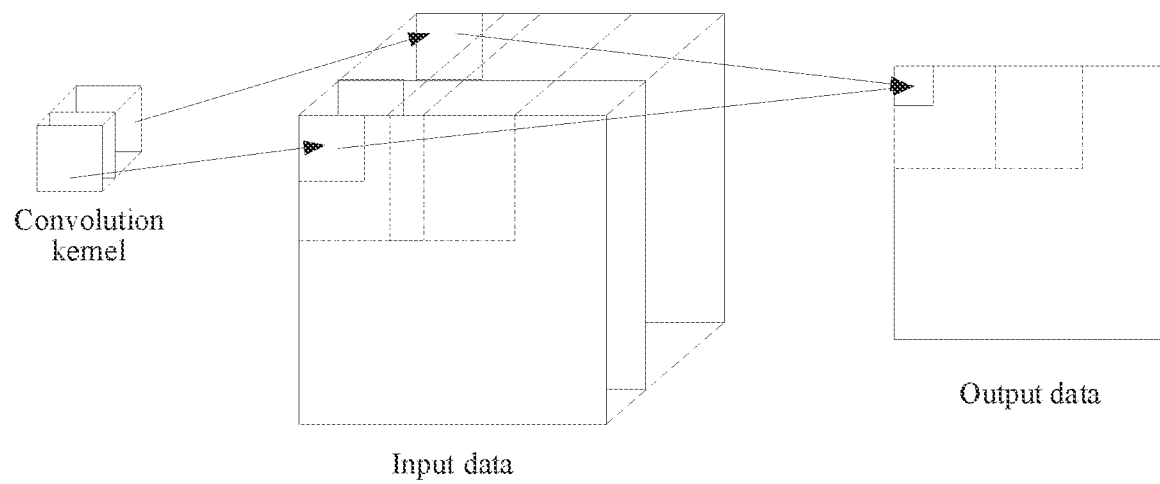
FIG. 7 is a schematic diagram of convolution processing according to an example embodiment of the disclosure.

For example, the to-be-processed data is picture data of 2048*2048*64 (width*height*channel), and a pad (extended) is 1, and a convolution operation with a stride of 1 is performed by using 32 groups of convolution kernels of 3*3 (width*height) in the AI chip. In the AI chip, a capacity of a storage space of input data is 16 KB*32, and a capacity of a storage space of output data is 16 KB*32. Due to parallel execution of the data processing and the data moving, the storage space of the input data is divided into two parts. As shown in FIG. 7, during convolution calculation, a data volume of the output data is the same as a data volume of the input data, and data splitting can be performed based on a size of the storage space of the input data, that is, 8 KB*32 is a maximum data volume of data obtained after the splitting. The data splitting may also be performed according to a specification of 60*60*64, and each data of 60*60*64 occupies a capacity of 7.2 KB*32. In this way, a sum of data volumes of two pieces of data obtained after the splitting is less than a total capacity of the storage space of the input data.

Figure 8:
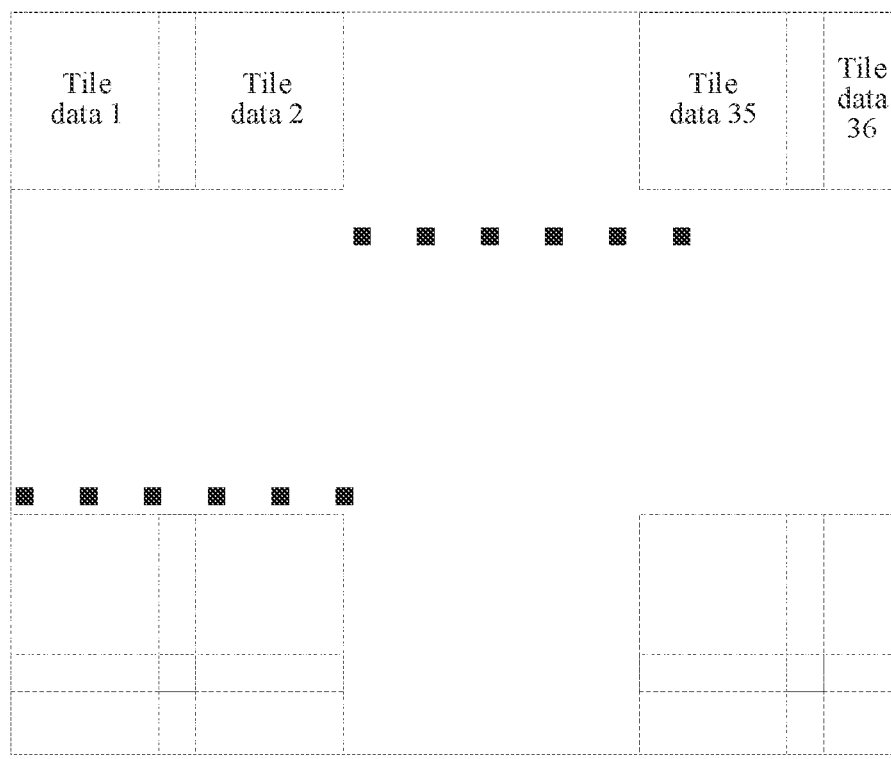
FIG. 8 is a schematic diagram of a plurality of pieces of split data according to an example embodiment of the disclosure.

In an example embodiment, the to-be-processed data is split into the plurality of pieces of data, that is, the to-be-processed data is split into a plurality of tiles (tile data). For example, a process of splitting the to-be-processed data into the plurality of tiles is shown in FIG. 8. FIG. 8 is a schematic diagram of a plurality of split tiles. A first row in FIG. 8 is used as an example, and the to-be-processed data is split into 36 tiles in total. The entire to-be-processed data is used as an example, the to-be-processed data is split into 36*36=1296 tiles in total.

The tiles in the first row are used as an example. A size of a first tile is 60*60*64, and a size of each of second to $35^{th}$ tiles is 60*60*64. Considering a sliding window characteristic of convolution, each tile of the second to $35^{th}$ tiles and a previous tile both have two columns that overlap, and a size of a new region in each tile is 60*58. A size of a $36^{th}$ tile is 60*20*64. Considering the sliding window characteristic of convolution, the tile and a previous tile have two columns that overlap. Therefore, a size of a new region in the tile is 60*18.

In an example embodiment of the disclosure, a splitting rule is determined by a developer according to at least one of: a capacity of the data cache unit, a requirement of the data processing unit on caching, a requirement of the data moving unit on the caching, or a change of data volumes before and after data processing in the processor during configuration of the processor, and the splitting rule is configured in the processor. Because after the processor is configured, data that needs to be processed by the processor is also determined, that is, a type and a data volume of to-be-processed data are determined, the splitting unit can split the to-be-processed data into a plurality of pieces of data according to the splitting rule configured by the developer.

In addition, after the to-be-processed data is split to obtain a plurality of pieces of split data, a data sequence formed by the plurality of pieces of data is stored in the data storage space. For example, the data sequence is shown in FIG. 8. The data sequence may be alternatively sorted in another manner, and a form of the data sequence is not limited in this embodiment of the disclosure.

602. An instruction processing unit moves at least one parallel control instruction stored in an instruction storage unit to an instruction cache unit.

The instruction storage unit is located outside the processor. The instruction storage unit may be a memory, or a storage medium, or a storage unit of another type. The instruction storage unit is configured to store a plurality of parallel control instructions, and the plurality of parallel control instructions are used for instructing the processor to process a plurality of pieces of data obtained by splitting one piece of to-be-processed data. The plurality of parallel control instruction can be recycled, that is, the plurality of parallel control instructions stored in the instruction storage unit can be used for processing a plurality of pieces of data obtained after splitting each to-be-processed data.

In an example embodiment, the plurality of parallel control instructions stored in the instruction storage unit are stored when the instruction storage unit is configured. In an example embodiment, the plurality of parallel control instructions in the instruction storage unit are inputted by using an instruction management program, and the instruction management program is a program used for managing the instruction storage unit. For example, the instruction management program can add, delete, or modify instructions in the instruction storage unit. In another example, the instruction management program can reset the instructions in the instruction storage unit.

When the processor needs to process data, the processor can read a parallel control instruction from the instruction storage unit. For example, a description is made by using an example in which the data processing unit processes first six pieces of data obtained through splitting. As shown in FIG. 9, a first parallel control instruction stored in the instruction storage unit is used for instructing the data moving unit to move first data A from the data storage unit to the data cache unit; a second parallel control instruction is used for instructing the data moving unit to move second data B from the data storage unit to the data cache unit and instructing the data processing unit to read the first data A that has been cached in the data cache unit, process the first data A, and output processed first data A to the data cache unit; a third parallel control instruction is used for instructing the data moving unit to move third data C to the data cache unit, instructing the data processing unit to read the second data B that has been cached in the data cache unit, process the second data B. and output processed second data B to the data cache unit, and instructing the data moving unit to move the first data A processed by the data processing unit from the data cache unit to the data storage unit; and for remaining parallel control instructions, reference is made to FIG. 9. Details regarding the remaining parallel control instructions are not described in this embodiment of the disclosure.

The data moving unit moves the third data C from the data storage unit to the data cache unit under instruction of the third parallel control instruction and further moves the processed first data A from the data cache unit to the data storage unit.

In an example embodiment, the data moving unit includes a first data moving subunit and a second data moving subunit. The first data moving subunit moves data from the data storage unit to the data cache unit, and the second data moving subunit moves data from the data cache unit to the data storage unit.

In addition, formats of the plurality of parallel control instructions stored in the instruction storage unit may be the same or different. In an example embodiment, any one of the plurality of parallel control instructions stored in the instruction storage unit includes: a valid field for controlling a unit to perform an operation. For example, as shown in FIG. 10, a parallel control instruction 1 includes a second valid field, the second valid field being used for indicating that the data moving unit moves the first data A from the data storage unit to the data cache unit; a parallel control instruction 2 includes a first valid field and a second valid field, the second valid field being used for indicating that the data moving unit moves the second data B from the data storage unit to the data cache unit, and the first valid field being used for indicating that the data processing unit reads the first data A that has been cached in the data cache unit, processes the first data A, and output the processed first data A to the data cache unit. The parallel control instructions carry different valid fields. Therefore, when controlled objects of the parallel control instruction 1 and the parallel control instruction 2 are different, formats of the parallel control instruction 1 and the parallel control instruction 2 are also different.

In an example embodiment, the formats of the plurality of parallel control instructions stored in the instruction storage unit are the same. Each parallel control instruction includes valid field indication information and a plurality of valid fields, the valid field indication information being a control indication of units in the processor and being used for indicating a valid field that is valid in a current parallel control instruction and which unit needs to perform an operation under the parallel control instruction. Each valid field defines information required by a corresponding unit to perform an operation.

For example, each parallel control instruction is shown in FIG. 11. A head of a parallel control instruction is valid field indication information, and there are a plurality of fields behind the indication information. If the parallel control instruction 1 is used for controlling the data moving unit to move data 1 from the data storage unit to the data cache unit, the second valid field of the parallel control instruction 1 is defined with a moving parameter, for example, a starting address of the data 1, an end address of the data 1, and a data length to be moved. For example, if another field of the parallel control instruction 1 is filled with a default value but is not defined with a corresponding parameter, it indicates that the another field is an invalid field.

For example, a parallel control instruction N is used for controlling the first data moving subunit to move data N from the data storage unit to the data cache unit, controlling the data processing unit to read data N−1 that has been stored in the data cache unit, process the data N−1, and output processed data N−1 to the data cache unit, and controlling the second data moving subunit to move processed data N−2 from the data cache unit to the data storage unit. A first field, a second field, and a fourth field of the parallel control instruction N are defined with corresponding parameters and are valid fields, and another field is filled with a default value and is an invalid field, N being any integer greater than 2.

The instruction cache unit is a unit inside the processor and has the characteristics of high costs, a small storage capacity, and a larger bandwidth than that of the instruction storage unit. The instruction storage unit is located outside the processor and has the characteristics of low costs, a large storage capacity, and a smaller bandwidth than that of the instruction cache unit. Therefore, during running of the processor, at least one parallel control instruction stored in the instruction storage unit is moved to the instruction cache unit, and it can be ensured that the instruction cache unit can supply a parallel control instruction continuously and seamlessly and the data processing unit and the data moving unit can receive the parallel control instruction in time.

That is, the instruction processing unit moves a parallel control instruction that is about to be executed from the instruction storage unit to the instruction cache unit. For example, after the parallel control instruction is moved from the instruction storage unit to the instruction cache unit, the parallel control instruction in the instruction storage unit does not disappear, so that when a plurality of pieces of data obtained after splitting next to-be-processed data are processed, the parallel control instruction is still moved from the instruction storage unit.

In an example embodiment, the moving, by an instruction processing unit, of at least one parallel control instruction stored in an instruction storage unit to an instruction cache unit includes: reading parallel control instructions in the instruction storage unit, and moving the read parallel control instructions to the instruction cache unit according to a reading sequence for caching, to obtain an instruction cache queue. Subsequently, the parallel control instruction is read from the instruction cache queue according to an instruction cache sequence. The instruction cache queue is a queue located in the instruction cache unit and includes at least one instruction.

Figure 12:
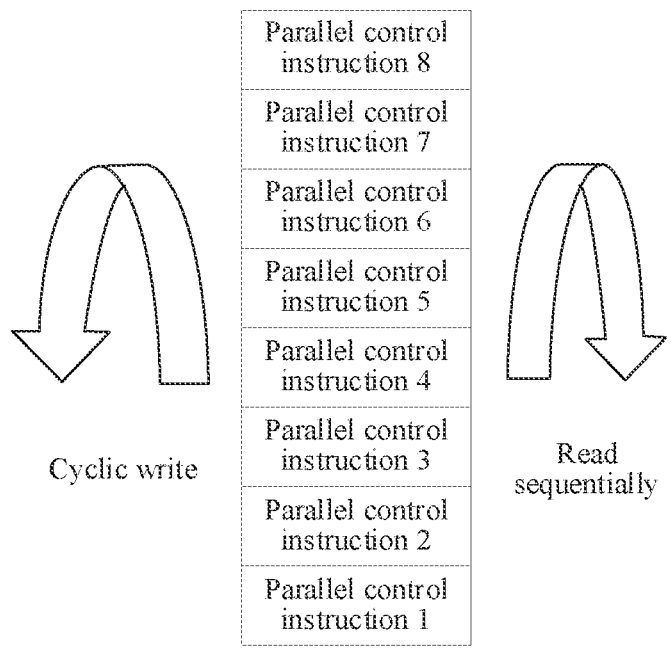
FIG. 12 is a schematic diagram of an instruction cache code according to an example embodiment of the disclosure.

For example, the instruction cache unit is a block first input first output (FIFO) queue structure. There is a space in the FIFO queue, and the instruction processing unit moves the parallel control instruction from the instruction storage unit to the instruction cache unit. Each data block of the instruction cache unit can store a parallel control instruction, and each parallel control instruction is used for controlling a plurality of units to perform corresponding operations. As shown in FIG. 12, each parallel control instruction occupies 64B. The instruction cache unit includes eight data blocks, each data block is used for storing a parallel control instruction, and all the eight data blocks store parallel control instructions, which occupy 512B in total. Therefore, the processor has a relatively small overall cost, is not affected by the parallel control instruction, and maintains relatively good scalability.

In this embodiment of the disclosure, an instruction storage unit stores a plurality of parallel control instructions required by processing a plurality of pieces of split data, and can reduce costs compared with storing the plurality of parallel control instructions in an instruction cache unit. In addition, because operation complexity of a processor gradually increases, a data volume of to-be-processed data gradually increases, and required parallel control instructions become more. The plurality of parallel control instructions are stored by using a storage medium outside the processor, which helps the costs of storage inside the processor to be reduced, and a problem that the parallel control instructions occupy a relatively large storage space due to a relatively large quantity of parallel control instructions and relatively long parallel control instructions to be better resolved by using two instruction storage units.

603. The instruction processing unit reads a parallel control instruction from at least one instruction stored in the instruction cache unit and simultaneously transmits the parallel control instruction to a data processing unit and a data moving unit.

In an example embodiment, the reading, by the instruction processing unit, a parallel control instruction from at least one instruction stored in the instruction cache unit includes: reading, by the instruction processing unit, a parallel control instruction with a longest storage time from the at least one instruction stored in the instruction cache unit, and simultaneously transmitting the parallel control instruction with the longest storage time in the instruction cache unit to the data processing unit and the data moving unit.

For example, the instruction cache unit is a block FIFO structure and stores parallel control instructions, and the instruction processing unit reads a parallel control instruction that first enters the instruction cache unit.

In another example embodiment, the reading, by the instruction processing unit, a parallel control instruction from at least one instruction stored in the instruction cache unit includes: reading the parallel control instruction from the instruction cache queue according to the instruction cache sequence.

For example, when the instruction processing unit simultaneously transmits the parallel control instruction to the data processing unit and the data moving unit, the parallel control instruction transmitted to the data processing unit and the data moving unit is the same, or the parallel control instructions transmitted to the data processing unit and the data moving unit are different.

In an example embodiment, the parallel control instruction simultaneously transmitted by the instruction processing unit to the data processing unit and the data moving unit is the same, as shown in FIG. 11, and includes valid field indication information and a plurality of valid fields. After receiving the parallel control instruction, the data processing unit determines a valid field corresponding to the data processing unit according to the valid field indication information in the parallel control instruction and performs an operation according to a corresponding indication in the valid field. After receiving the parallel control instruction, the data moving unit determines a valid field corresponding to the data moving unit according to the valid field indication information in the parallel control instruction and performs an operation according to a corresponding indication in the valid field.

In an example embodiment, the parallel control instructions simultaneously transmitted by the instruction processing unit to the data processing unit and the data moving unit are different. For example, after reading a parallel control instruction, the instruction processing unit extracts a data processing instruction and a data moving instruction in the parallel control instruction, transmits the data processing instruction to the data processing unit, and transmits the data moving instruction to the data moving unit.

The extracting a data processing instruction and a data moving instruction in the parallel control instruction includes: extracting valid field indication information in the parallel control instruction; and determining a first valid field and a second valid field in the parallel control instruction according to the valid field indication information, and reading the first valid field and the second valid field from the parallel control instruction, to obtain the data processing instruction and the data moving instruction. For example, the first valid field is read from the parallel control instruction to obtain the data processing instruction; and the second valid field is read from the parallel control instruction to obtain the data moving instruction. Therefore, the data processing unit and the data moving unit can directly perform corresponding operations according to the received data processing instruction and the received data moving instruction.

The valid field indication information is used for indicating which field in the plurality of fields of the parallel control instruction is a valid field, and a unit or a subunit receiving an instruction is determined according to the valid field. For example, a parallel control instruction includes valid field indication information and six fields, the six fields respectively matching six subunits. If the valid field indication information indicates that a first field and a third field are valid fields, a control instruction carrying the first field is transmitted to a subunit corresponding to the first field, and a control instruction carrying the third field is transmitted to a subunit corresponding to the third field at the same time.

In addition, the simultaneously transmitting, by the instruction processing unit, the parallel control instruction to the data processing unit and the data moving unit includes: simultaneously transmitting, by the instruction processing unit according to any target data in the data storage unit, the parallel control instruction matching the target data to the data processing unit and the data moving unit.

The parallel control instruction matching the target data refers to an instruction instructing the data moving unit to move the target data from the data storage unit to the data cache unit and instructing the data processing unit to process previous data of the target data.

For example, the simultaneously transmitting, by the instruction processing unit according to any target data in the data storage unit, the parallel control instruction matching the target data to the data processing unit and the data moving unit includes: transmitting, by the instruction processing unit, the data processing instruction to the data processing unit and simultaneously transmitting the data moving instruction to the data moving unit, the data processing instruction indicating processing of previous data of the target data, and the data moving instruction indicating that the target data is moved from the data storage unit to the data cache unit.

To enable the data processing unit and the data moving unit to process data in parallel, when the processor starts working, the data moving unit needs to first move first data from the data storage unit to the data cache unit, and subsequently, the data processing unit and the data moving unit can run in parallel. Therefore, when the processor starts working, the instruction processing unit first transmits a parallel control instruction to the data moving unit to control the data moving unit to move data, and then simultaneously transmits a parallel control instruction to the data processing unit and the data moving unit, so that the data processing unit and the data moving unit can run in parallel. Operation 604 to operation 609 is a description of a process in which any data processing unit and any data moving unit run in parallel.

604. The data processing unit reads, according to the parallel control instruction, first data that has been cached in the data cache unit, processes the first data, and outputs processed first data to the data cache unit.

First data is any data in the plurality of pieces of split data. In an example embodiment, a data sequence formed by the plurality of pieces of split data is stored in the data storage space, and the first data is any data in the data sequence.

For example, the parallel control instruction includes valid field indication information and a plurality of valid fields, and after receiving the parallel control instruction, the data processing unit obtains a first valid field in the parallel control instruction according to the valid field indication information in the parallel control instruction.

In an example embodiment, the reading, by the data processing unit according to the parallel control instruction, first data that has been cached in the data cache unit, processing the first data, and outputting processed first data to the data cache unit includes: extracting, by the data processing unit, valid field indication information in the parallel control instruction, determining a first valid field according to the valid field indication information, reading, according to the first valid field, the first data that has been cached in the data cache unit, processing the first data, and outputting the processed first data to the data cache unit.

For example, the parallel control instruction is a first control instruction, the first control instruction carrying a first valid field used for controlling the data processing unit, and the data processing unit can read, according to the first valid field, the first data that has been cached in the data cache unit, process the first data, and output the processed first data to the data cache unit.

The reading, by the data processing unit according to the first valid field, the first data that has been cached in the data cache unit includes: reading, by the data processing unit, the first data according to a cached position of the first data, the first valid field indicating the cached position of the first data; or autonomously reading, by the data processing unit, the cached first data from a first storage space of the data cache unit, the first valid field indicating that the data processing unit is started. For example, the data processing unit is configured with a program for reading data that has been cached in the data cache unit, processing the data, and outputting processed data to the data cache unit, and the first valid field indicating that the data processing unit is started refers to that the first valid field indicates that the data processing unit runs the program.

In addition, the processing, by the data processing unit, the first data according to the first valid field includes that: the first valid field indicating a processing operation that needs to be performed by the data processing unit, the data processing unit performs the processing operation indicated by the first valid field to process the first data; or the first valid field indicating that the data processing unit is started, the data processing unit starts and processes the first data according to a configured processing operation.

In addition, the outputting, by the data processing unit, processed first data to the data cache unit includes: the first valid field indicating a position of a second storage space, outputting, by the data processing unit according to the first valid field, the processed first data to the second storage space of the data cache unit; or the first valid field not indicating a position of a second storage space, autonomously outputting, by the data processing unit, the processed first data to the second storage space of the data cache unit.

605. The data moving unit moves to-be-processed second data from the data storage unit to the data cache unit according to the parallel control instruction, the second data being next data of the first data.

Second data is next data of the first data in the plurality of split data. For example, as shown in FIG. 8, the first data is tile 1, and the second data is tile 2. In an example embodiment, a data sequence formed by the plurality of pieces of data is stored in the data storage space, and the second data is next data of the first data in the data sequence.

For example, the parallel control instruction includes valid field indication information and a plurality of valid fields, and after receiving the parallel control instruction, the data moving unit can obtain a second valid field in the parallel control instruction according to the valid field indication information in the parallel control instruction. In an example embodiment, the moving, by the data moving unit, to-be-processed second data from the data storage unit to the data cache unit according to the parallel control instruction includes: extracting, by the data moving unit, valid field indication information in the parallel control instruction, determining a second valid field in the parallel control instruction according to the valid field indication information, and moving the to-be-processed second data from the data storage unit to the data cache unit according to the second valid field.

For example, the parallel control instruction is a second control instruction, the second control instruction carrying a second valid field used for controlling the data moving unit, and the data moving unit can move the to-be-processed second data from the data storage unit to the data cache unit according to the second valid field.

For example, the second valid field includes at least one of a starting storage position of the second data in the data storage unit, an end storage position of the second data in the data storage unit, a target position of which the second data is moved to the data cache unit, a data length of the second data, or the like. The second data occupies a particular storage space in the data storage unit, and the storage space occupied by the second data can be accurately determined by using the starting storage position and the end storage position of the second data in the data storage unit. The moving, by the data moving unit, the to-be-processed second data from the data storage unit to the data cache unit according to the second valid field includes: reading, by the data moving unit, the second data from the data storage unit according to the starting storage position of the second data in the data storage unit and the data length of the second data, and moving the second data to the target position according to the target position.

For example, the data moving unit includes a plurality of subunits. Therefore, operation 605 may be completed by using a first data moving subunit in the data moving unit.

606. The data moving unit moves processed third data from the data cache unit to the data storage unit according to the parallel control instruction, the third data being previous data of the first data.

Third data is previous data of the first data in the plurality of pieces of split data. As shown in FIG. 8, when the first data is tile 3, the third data is tile 2. In an example embodiment, a data sequence formed by the plurality of pieces of split data is stored in the data storage space. Therefore, the third data is previous data of the first data in the data sequence.

The third data is data in the data sequence formed by the plurality of pieces of split data, and the third data is previous data of the first data.

For example, the parallel control instruction includes valid field indication information and a plurality of valid fields, and after receiving the parallel control instruction, the data moving unit can determine corresponding valid fields according to the valid field indication information in the parallel control instruction, and obtain a third valid field in the valid fields, the third valid field being a field used for controlling the data moving unit to perform an operation on processed data. In an example embodiment, the data moving unit extracts valid field indication information in the parallel control instruction, determines a third valid field in the parallel control instruction according to the valid field indication information, and moves the processed third data from the data cache unit to the data storage unit according to the third valid field.

For example, the parallel control instruction is a data moving instruction, the data moving instruction carrying a third valid field used for controlling the data moving unit, and the data moving unit moves the processed third data from the data cache unit to the data storage unit according to the third valid field.

For example, the third valid field includes at least one of a starting storage position of the third data in the data cache unit, an end storage position of the third data in the data cache unit, a data length of the processed third data, a target position of the processed third data in the data storage unit, and the like. The third data occupies a particular storage space in the data cache unit, and the storage space occupied by the third data can be accurately determined by using the starting storage position and the end storage position of the third data in the data cache unit. The moving, by the data moving unit, the processed third data from the data cache unit to the data storage unit according to the third valid field includes: reading, by the data moving unit, the processed third data from the data cache unit according to the starting storage position of the processed third data in the data cache unit and the data length of the processed third data, and moving the processed third data to the target position in the data storage unit.

In addition, the data moving unit includes a plurality of subunits. Therefore, operation 606 is completed by using a second data moving subunit in the data moving unit.

When simultaneously transmitting the parallel control instruction to the data processing unit and the data moving unit, the instruction processing unit cannot instruct the processor to complete all operations to be performed on to-be-processed data, and needs to further transmit the parallel control instruction to the data processing unit and the data moving unit continuously. For example, a moment in which the instruction processing unit transmits the parallel control instruction to the data processing unit and the data moving unit again is that the data processing unit and the data moving unit have completed works according to the previous parallel control instruction. A description is made by using operation 607 to operation 609 below.

In this embodiment of the disclosure, the data moving unit further moves processed data outputted by the data processing unit from the data cache unit to the data storage unit. Therefore, the data storage unit is not only configured to store a plurality of pieces of data obtained by splitting to-be-processed data but also configured to store data processed by the data processing unit. In addition, when the processor processes data, the data processing unit needs to process the data for a plurality of times, or the data processing unit includes a plurality of data processing subunits, and the plurality of data processing subunits need to process the data sequentially. Therefore, the second data is the to-be-processed data, or data outputted after previous processing of the data processing unit, or processed data outputted by a data processing subunit in the data processing unit.

607. The data processing unit transmits a first completion message to the instruction processing unit after the data processing unit outputs the processed first data to the data cache unit.

A first completion message is used for indicating that the data processing unit has performed an operation. For example, the first completion message carries an identifier of the data processing unit, so that the instruction processing unit determines, according to the first completion message, that the data processing unit has completed the operation. The identifier of the data processing unit is an identifier for determining the unique data processing unit. For example, the identifier is a number of the data processing unit or a name of the data processing unit.

608. The data moving unit transmits a second completion message to the instruction processing unit after the data moving unit moves the second data from the data storage unit to the data cache unit, and moves the processed third data from the data cache unit to the data storage unit.

A second completion message is used for indicating that the data moving unit has performed an operation. For example, the second completion message carries an identifier of the data moving unit, so that the instruction processing unit determines, according to the second completion message, that the data moving unit has completed the operation. The identifier of the data moving unit is an identifier for determining the unique data moving unit, and may be a number of the data moving unit, a name of the data moving unit, or the like.

If the parallel control instruction only instructs the data moving unit to move the second data from the data storage unit to the data cache unit, and after the data moving unit moves the second data from the data storage unit to the data cache unit, the data moving unit transmits the second completion message to the instruction processing unit. If the parallel control instruction only instructs the data moving unit to move the processed third data from the data cache unit to the data storage unit, and after the data moving unit moves the processed third data from the data cache unit to the data storage unit, the data moving unit transmits the second completion message to the instruction processing unit. If the parallel control instruction instructs the data moving unit to move the second data from the data storage unit to the data cache unit, and move the processed third data from the data cache unit to the data storage unit, and after the data moving unit moves the second data from the data storage unit to the data cache unit and moves the processed third data from the data cache unit to the data storage unit, the data moving unit transmits the second completion message to the instruction processing unit.

609. The instruction processing unit simultaneously transmits a next parallel control instruction matching fourth data to the data processing unit and the data moving unit after receiving the first completion message and the second completion message, the fourth data being next data of the second data in the plurality of pieces of split data.

After the data moving unit moves the second data from the data storage unit to the data cache unit, the data moving unit needs to continue to move next data of the second data, that is, fourth data. Therefore, the instruction processing unit needs to read a next parallel control instruction matching the fourth data, and simultaneously transmits the next parallel control instruction to the data processing unit and the data moving unit, the next parallel control instruction being used for controlling the data moving unit to move the fourth data from the data storage unit to the data cache unit, being further used for controlling the data processing unit to read the second data that has been cached in the data cache unit, process the second data, and output the processed second data to the data cache unit; and being further used for controlling the data moving unit to move the processed first data from the data cache unit to the data storage unit.

Figure 13:
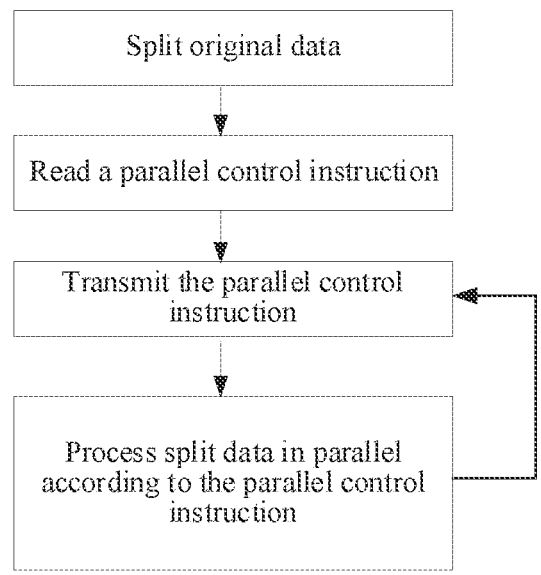
FIG. 13 is a flowchart of a data processing method according to an example embodiment of the disclosure.
Figure 14:
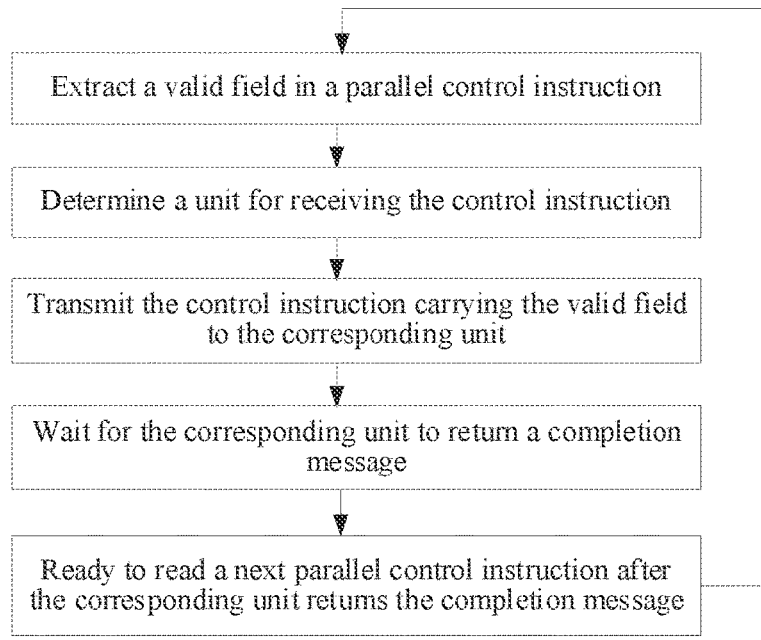
FIG. 14 is a flowchart of a data processing method according to an example embodiment of the disclosure.

In addition, the plurality of parallel control instructions stored in the instruction storage unit are used for controlling the processor to complete a processing operation on a plurality of pieces of data obtained by splitting to-be-processed data. Therefore, the plurality of parallel control instructions are sorted in sequence according to a processing process of the processor, and the instruction processing unit moves at least one parallel control instruction in the instruction storage unit to the instruction cache unit according to a sequence. Therefore, a sorting sequence of the at least one parallel control instruction in the instruction cache unit matches the processing process of the processor. Therefore, the instruction processing unit can directly read a parallel control instruction with a longest current storage time in the instruction storage unit, the parallel control instruction being the next parallel control instruction matching the fourth data. A process of the data processing method is shown in FIG. 13 and FIG. 14.

Operation 601 provided in this embodiment of the disclosure is an optional step. In an example embodiment, in a case that the computer device needs to process a plurality of pieces of to-be-processed data, each to-be-processed data is not split into a plurality of pieces of data by using the splitting unit, but the plurality of pieces of to-be-processed data are directly processed. Although a process of moving the to-be-processed data may be relatively slow, data processing and data moving are performed in parallel, to as much as possible avoid waiting for execution of a data moving process before a data processing process is performed, thereby still improving the processing efficiency of the processor. Therefore, whether to split the to-be-processed data is not limited in this embodiment of the disclosure.

The data processing process is a data processing process of a neural network model. In an example embodiment, the reading, by the data processing unit according to the parallel control instruction, first data that has been cached in a data cache space, processing the first data, and outputting processed first data to the data cache space includes: reading, by the data processing unit according to the parallel control instruction and based on a neural network model, the first data that has been cached in the data cache space; and processing the first data, and outputting the processed first data to the data cache space.

In addition, the data processing unit further includes a plurality of data processing subunits, and data processing of the neural network model is implemented by using the plurality of data processing subunits. In an example embodiment, the data processing subunits simultaneously receive data processing instructions corresponding to the data processing subunits, and perform data processing in parallel according to the data processing instructions.

For example, a first data processing subunit is configured to perform convolution processing on data, and a second data processing subunit is configured to perform pooling processing on the data. If the first data processing subunit receives a corresponding data processing instruction, the first data processing subunit reads first data that has been cached in the data cache unit, performs convolution processing on the first data, and outputs the first data after the convolution processing to the data cache unit. In addition, if the second data processing subunit receives a corresponding data processing instruction, the second data processing subunit reads third data that has been cached in the data cache unit and on which convolution processing has been performed, performs pooling processing on the third data after the convolution processing, and outputs the third data after the pooling processing to the data cache unit. The third data is previous data of the first data in the plurality of pieces of split data.

According to the data processing method provided in this embodiment of the disclosure, a parallel control instruction is simultaneously transmitted to a data processing unit and a data moving unit, so that the data processing unit and the data moving unit can run in parallel. In addition, the data processing unit currently processes previous data moved by the data moving unit, and the data processing unit can process the data without waiting for completion of current moving of the data moving unit, so that the data processing process no longer depends on the data moving process, thereby improving a processing speed and processing efficiency.

In addition, in the related art, to avoid time-consuming when the data moving unit moves relatively large to-be-processed data, processing such as compression or cropping is performed on the to-be-processed data, to reduce a data volume of the to-be-processed data. However, information in a picture is lost due to the processing such as compression or cropping, and in this embodiment of the disclosure, the processing such as compression or cropping is not performed on the to-be-processed data. Therefore, information in the to-be-processed data is not lost, thereby ensuring accuracy in a processing result of the processor.

In addition, in the related art, to avoid time-consuming when the data moving unit moves the relatively large to-be-processed data, a cache unit with a larger capacity is configured for the processor, so that the processor can accommodate the to-be-processed data. When the processor performs data processing, the to-be-processed data may be moved only in the processor, to increase a moving speed; or a higher bus bandwidth such as high bandwidth memory (HBM) is used during processing, that is, time-consuming of data moving is reduced by improving data transmission efficiency. However, the cache unit with the larger capacity is configured for the processor, resulting in increasing of an area of the processor and significantly increasing of costs; and the HBM also significantly increases costs.

In addition, according to the data processing method provided in this embodiment of the disclosure, the to-be-processed data is split into a plurality of pieces of data, the plurality of pieces of data are processed, and a data processing process and a data moving process are performed in parallel, to avoid a waiting time of the data processing process to the data moving process as much as possible, thereby reducing impact of the data moving on the processing speed of the processor. Therefore, in this embodiment of the disclosure, there is no relatively high requirement on the cache unit and the bandwidth of the processor, and the cost of the processor is not increased.

In addition, in the related art, when two or more units are controlled to perform parallel processing, because one instruction can control only one unit to perform an operation, if the two or more units are desired to be controlled to perform parallel processing, interaction control between software and hardware is required. Through synchronization and scheduling of a plurality of instructions, for example, two operations are performed in parallel as much as possible by using a plurality of instruction processing units according to a complex scheduling and synchronization mechanism.

In this embodiment of the disclosure, a parallel control instruction may be simultaneously transmitted to the data processing unit and the data moving unit of the processor by using one instruction processing unit, so that the data processing unit and the data moving unit perform parallel processing. An instruction may be simultaneously transmitted to two or more units by using only one instruction processing unit without a plurality of instruction processing units, and interaction scheduling between the plurality of instruction processing units is not required, thereby implementing a low cost. In addition, during processing of the processor, interaction between the software and the hardware is not required, to avoid performance penalty of the processor caused by the interaction between the software and the hardware.

In addition, in this embodiment of the disclosure, an instruction storage unit located outside the processor stores a plurality of parallel control instructions corresponding to a plurality of pieces of data obtained after to-be-processed data is split, and can greatly reduce costs compared with storing the plurality of parallel control instructions in an instruction cache unit. In addition, because operation complexity of a processor gradually increases, a data volume of to-be-processed data gradually increases, and required parallel control instructions become more. The plurality of parallel control instructions are stored by using a storage unit outside the processor, costs of storage inside the processor can be saved, and a problem that the parallel control instructions occupy a relatively large storage space due to a relatively large quantity of parallel control instructions and relatively long parallel control instructions is better resolved by using two instruction storage units.

Figure 15:
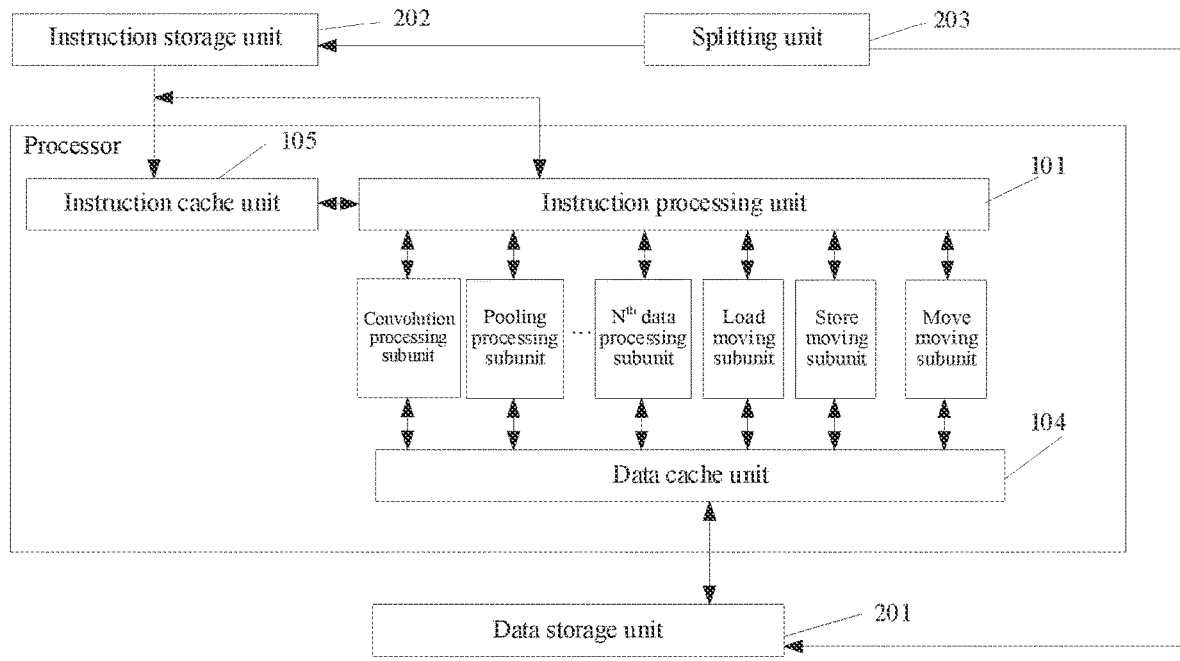
FIG. 15 is a schematic diagram of a processor according to an example embodiment of the disclosure.

In an example embodiment, the processor is an AI chip. As shown in FIG. 15, the AI chip is configured to perform a calculation task performed by a neural network model in the AI application. A description is made by using an example in which the data processing unit of the processor includes a convolution processing subunit, the data moving unit includes a load moving subunit and a store moving subunit, and the to-be-processed data is split into 1296 tiles.

After the processor is used, specific content of the to-be-processed data is not fixed, but a type and a size of the to-be-processed data of the processor are fixed. Therefore, after the to-be-processed data is split into a plurality of pieces of data, a size of each data and a quantity of data are also fixed. Therefore, a quantity of parallel control instructions for processing the plurality of pieces of split data is also fixed. For example, a plurality of split tiles are 1296 tiles, and there are 1298 parallel control instructions. In this embodiment of the disclosure, a convolution processing process of the processor is described by using an example in which there are six tiles and eight parallel control instructions, as shown in FIG. 16.

In a case that the AI application analyzes the to-be-processed data, a first parallel control instruction is used for controlling the load moving subunit to work, a second parallel control instruction is used for controlling the load moving subunit and the convolution processing subunit to work, a third parallel control instruction to a sixth parallel control instruction are used for controlling the load moving subunit, the convolution processing subunit, and the store moving subunit to work, a seventh parallel control instruction is used for controlling the convolution processing subunit and the store moving subunit to work, and an eighth parallel control instruction is used for controlling the store moving subunit to work. The load moving subunit is configured to move the plurality of pieces of split data from the data storage unit to the data cache unit in sequence, and the store moving subunit is configured to move data processed by the convolution processing subunit from the data cache unit to the data storage unit.

Therefore, after the eight parallel control instructions are executed, the processor completes convolution processing on the six tiles and moves processed six tiles to the data storage unit.

For example, the data processing unit further includes any subunit in other processing subunit such as a pooling processing subunit and a full connection processing subunit. In this embodiment of the disclosure, a processing process of the processor is described by using an example in which the data processing unit further includes a pooling processing subunit.

After completing convolution processing on the six tiles, the processor moves the processed six tiles to the data storage unit. Therefore, the six tiles after the convolution processing further need to be moved from the data storage unit to the data cache unit in sequence, and pooling processing is performed on the six tiles after the convolution processing in sequence. The pooling processing process is similar to the convolution processing process, and details are not described herein again.

In an example embodiment, the processor performs convolution processing and pooling processing on the plurality of pieces of split data. After convolution processing is performed on one tile, the tile after the convolution processing is used as an input of the pooling processing subunit, and after pooling processing is performed on the tile, the tile after the pooling processing is moved to the data storage unit.

The convolution processing process of the processor is described by using an example in which there are six tiles and 10 parallel control instructions, as shown in FIG. 17. The data moving unit further includes a move moving subunit, the move moving subunit being configured to move data in the data cache unit from a first target position to a second target position.

A first parallel control instruction is used for controlling the load moving subunit to work, a second parallel control instruction is used for controlling the load moving subunit and the convolution processing subunit to work, a third parallel control instruction is used for controlling the load moving subunit, the convolution processing subunit, and the move moving subunit to work, a fourth parallel control instruction is used for controlling the load moving subunit, the convolution processing subunit, the move moving subunit, and the pooling processing subunit to work, and a fifth parallel control instruction and a sixth parallel control instruction are used for controlling the load moving subunit, the convolution processing subunit, the move moving subunit, the pooling processing subunit, and the store moving subunit to work. A seventh parallel control instruction is used for controlling the convolution processing subunit, the move moving subunit, the pooling processing subunit, and the store moving subunit to work. An eighth parallel control instruction is used for controlling the move moving subunit, the pooling processing subunit, and the store moving subunit to work. A ninth parallel control instruction is used for controlling the pooling processing subunit and the store moving subunit to work. A tenth parallel control instruction is used for controlling the store moving subunit to work.

The move moving subunit is configured to move data in an output storage space corresponding to the convolution processing subunit to an input storage space corresponding to the pooling processing subunit. The store moving subunit is configured to move pooled data outputted by the pooling processing subunit from the data cache unit to the data storage unit.

Figure 18:
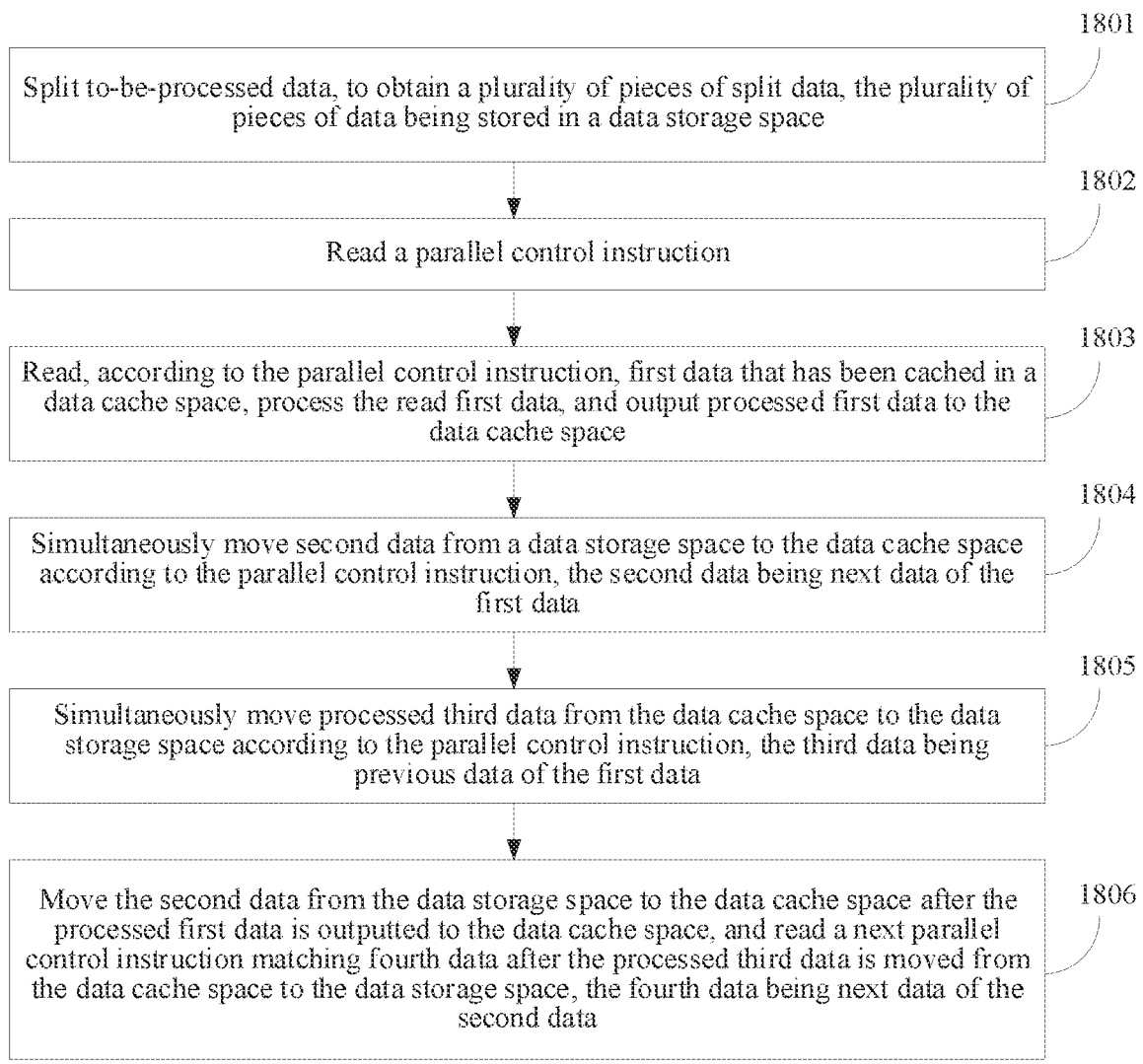
FIG. 18 is a flowchart of a data processing method according to an example embodiment of the disclosure.

In addition, the data processing method provided in the embodiments is not only applicable to the processor of the computer device, but also applicable to another component. This is not limited in this embodiment of the disclosure. FIG. 18 is a flowchart of a data processing method according to an embodiment of the disclosure. The execution body of this embodiment of the disclosure is any computer device. Referring to FIG. 18, the method includes the following operations.

1801. Split to-be-processed data, to obtain a plurality of pieces of split data, the plurality of pieces of data being stored in a data storage space.

If a data volume of to-be-processed data is relatively large, to reduce a time consumed for moving data each time, the to-be-processed data is split into a plurality of pieces of data. In addition, when the plurality of pieces of split data are processed subsequently, the plurality of pieces of split data are moved from a data storage space to a data cache space in sequence. Therefore, in an example embodiment, the to-be-processed data is split into the plurality of pieces of data according to a splitting rule, the splitting rule indicating that a data volume of any data obtained through splitting is not greater than a cache capacity of the data cache space.

For example, to-be-processed data is obtained, the to-be-processed data is split according to the cache capacity of the data cache space to obtain a plurality of pieces of data, and a data sequence formed by the plurality of pieces of data is stored in the data storage space.

For example, the to-be-processed data is feature map data, and the to-be-processed data is split into the plurality of pieces of data according to the cache capacity of the data cache space. For example, the cache capacity of the data cache space is 16 KB, a size of the feature map data is 128*128*128, and the feature map data is split, to obtain 16 pieces of feature map data of 32*32*128.

For example, the to-be-processed data is picture data, and the to-be-processed data is averagely split into the plurality of pieces of data according to the cache capacity of the data cache space. For example, the cache capacity of the data cache space is 16 KB, a size of the picture data is 128*128*3, and the picture data is split, to obtain 16 pieces of picture data with 32*32*3.

The data storage space is a space in any data storage unit of the computer device, and the data storage space is not limited in this embodiment of the disclosure.

1802. Read a parallel control instruction.

An instruction cache space caches a plurality of parallel control instructions. For example. The plurality of parallel control instructions in the instruction cache space are obtained from an instruction storage space, the instruction storage space stores the plurality of parallel control instructions used for indicating that the plurality of pieces of split data are processed, the plurality of parallel control instructions are sorted according to an indication sequence, and the plurality of parallel control instructions are sequentially cached into the instruction cache space according to a sorting sequence, thereby reading a parallel control instruction with a longest caching time in the instruction cache space.

In an example embodiment, the reading a parallel control instruction includes: reading parallel control instructions in an instruction storage space; moving the read parallel control instructions to an instruction cache space according to a reading sequence for caching, to obtain an instruction cache queue; and reading the parallel control instruction from the instruction cache queue according to an instruction cache sequence. The instruction cache queue is a queue located in the instruction cache space and including at least one instruction.

In an example embodiment, the parallel control instruction includes a data processing instruction and a data moving instruction, the data processing instruction carrying a first valid field, and the data moving instruction carrying a second valid field, so that the data processing instruction and the data moving instruction are used for indicating different operations. For example, the first valid field is used for indicating that a processing operation is performed on the first data, and the second valid field is used for indicating that a cache operation is performed on the second data.

In an example embodiment, after the reading a parallel control instruction, the method further includes: extracting valid field indication information in the parallel control instruction; determining a first valid field and a second valid field in the parallel control instruction according to the valid field indication information; and reading the first valid field and the second valid field from the parallel control instruction, to obtain the data processing instruction and the data moving instruction. For example, the first valid field is read to obtain the data processing instruction, and the second valid field is read to obtain the data moving instruction.

In an example embodiment, the instruction cache space is an instruction cache unit, and the instruction storage space is an instruction storage unit.

1803. Read, according to the parallel control instruction, first data that has been cached in a data cache space, process the read first data, and output processed first data to the data cache space.

First data is any data in the plurality of pieces of split data. Because a data sequence formed by the plurality of pieces of split data is stored in the data storage space, the first data is any data in the data sequence.

In an example embodiment, the to-be-processed data is picture data, and the first data is data in a plurality of pieces of data obtained after the to-be-processed data is split. Therefore, the first data is a small picture.

In an example embodiment, the reading, according to the parallel control instruction, first data that has been cached in a data cache space, processing the read first data, and outputting processed first data to the data cache space includes: reading, according to the parallel control instruction based on a neural network model, the first data that has been cached in the data cache space; and processing the first data, and outputting the processed first data to the data cache space.

In an example embodiment, the parallel control instruction is a data processing instruction, the reading, according to the parallel control instruction, first data that has been cached in a data cache space, processing the read first data, and outputting processed first data to the data cache space includes: reading, according to a first valid field carried in the data processing instruction, the first data that has been cached in the data cache space, processing the read first data, and outputting the processed first data to the data cache space.

In an example embodiment, the reading, according to the parallel control instruction, first data that has been cached in a data cache space, processing the read first data, and outputting processed first data to the data cache space includes: extracting valid field indication information in the parallel control instruction; and determining a first valid field in the parallel control instruction according to the valid field indication information, reading, according to the first valid field, the first data that has been cached in the data cache space, processing the read first data, and outputting the processed first data to the data cache space.

1804. Simultaneously move second data from a data storage space to the data cache space according to the parallel control instruction, the second data being next data of the first data.

1805. Simultaneously move processed third data from the data cache space to the data storage space according to the parallel control instruction, the third data being previous data of the first data.

1806. Move the second data from the data storage space to the data cache space after the processed first data is outputted to the data cache space, and read a next parallel control instruction matching fourth data after the processed third data is moved from the data cache space to the data storage space, the fourth data being next data of the second data.

After a next parallel control instruction is read, the second data that has been cached in the data cache space is read according to the next parallel control instruction, the second data is processed, and the processed second data is outputted to the data cache space. In addition, fourth data is moved from the data storage space to the data cache space according to the parallel control instruction, and the processed first data is moved from the data cache space to the data storage space according to the parallel control instruction. After the operation is performed, a process of reading a next parallel control instruction and performing an operation according to the next parallel control instruction is performed repeatedly until the plurality of pieces of split data are processed or until all the plurality of parallel control instructions in the data storage space are executed.

The data processing method is applicable to a neural network model. In an example embodiment, the first data that has been cached in the data cache space is read according to the parallel control instruction based on a neural network model, the first data is processed, and the processed first data is outputted to the data cache space.

In addition, the neural network model includes a plurality of layers. In an example embodiment, data processing is performed in parallel according to a data processing instruction corresponding to each layer in the neural network model, that is, data processing is performed by each layer in the neural network model in parallel.

For example, the neural network model includes a convolutional layer and a pooling layer, and parallel data processing of each layer in the neural network model is described. A data processing instruction corresponding to the convolutional layer and a data processing instruction corresponding to the pooling layer are received simultaneously; the first data that has been cached in the data cache space is read based on the convolutional layer, convolution processing is performed on the first data, and the first data after the convolution processing is outputted to the data cache space; and simultaneously, third data after the convolution processing that has been cached in the data cache space is read based on the pooling layer, pooling processing is performed on the third data after the convolution processing, and the third data after the pooling processing is outputted to the data cache space, and parallel running of the convolutional layer and the pooling layer is implemented.

According to the data processing method provided in this embodiment of the disclosure, a parallel control instruction is read, and a data processing operation and a data moving operation are simultaneously performed according to the parallel control instruction, to reduce a duration of which the data processing operation waits for the data moving operation as far as possible, thereby improving a data processing speed and data processing efficiency. In addition, previous data moved by the data moving unit is processed currently, and the data may be processed without waiting for the data moving process, thereby reducing dependence of the data processing process on the data moving processing and improving a processing speed and processing efficiency.

In addition, in the related art, to avoid time-consuming during moving of relatively large to-be-processed data, processing such as compression or cropping is performed on the to-be-processed data, to reduce a data volume of the to-be-processed data. However, information in a picture is lost due to the processing such as compression or cropping, and in this embodiment of the disclosure, the processing such as compression or cropping is not performed on the to-be-processed data. Therefore, information in the to-be-processed data is not lost, thereby ensuring accuracy in a processing result of the processor.

In addition, in the related art, to avoid time-consuming during moving of the relatively large to-be-processed data, a data cache space with a larger cache capacity is set. In this way, a moving speed can be increased during data processing; or a higher bus bandwidth such as an HBM is used, that is, time-consuming of data moving is reduced by improving data transmission efficiency. However, the cache space with a larger cache capacity is set, resulting in significantly increasing of costs; and the HBM also significantly increases costs.

In addition, according to the data processing method provided in this embodiment of the disclosure, the to-be-processed data is split into a plurality of pieces of data, the plurality of pieces of data are processed, and a data processing process and a data moving process are performed in parallel, to avoid a waiting time of the data processing process to the data moving process as much as possible, thereby reducing impact of the data moving on the processing speed. Therefore, in this embodiment of the disclosure, there is no relatively high requirement on the data cache space and the bandwidth, and the cost of the processor is not increased.

In addition, in related art, one instruction can be used for indicating that only one operation is performed. Therefore, it two or more operations are desired to be performed, interaction control between software and hardware is required. Through synchronization and scheduling of a plurality of instructions, for example, two operations are performed in parallel as much as possible by using a plurality of instruction processing units according to a complex scheduling and synchronization mechanism.

In this embodiment of the disclosure, a parallel control instruction may be read, data processing and data moving is performed simultaneously according to the parallel control instruction without a plurality of instruction processing units, and interaction scheduling between the plurality of instruction processing units is not required, thereby implementing a low cost. In addition, during data processing, interaction between the software and the hardware is not required, to avoid data processing performance penalty caused by the interaction between the software and the hardware.

Figure 19:
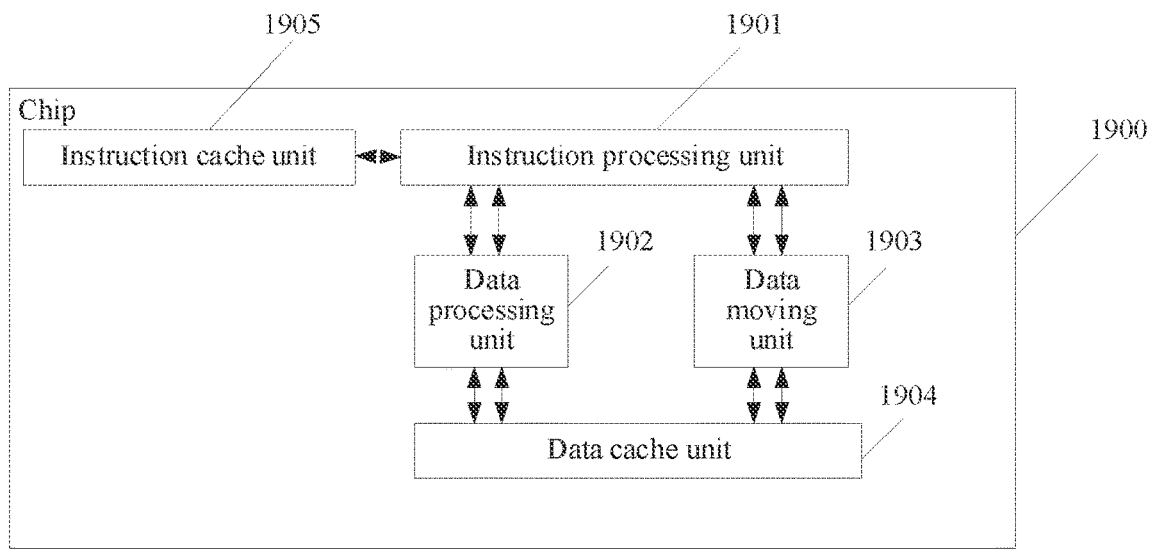
FIG. 19 is a schematic diagram of a chip according to an example embodiment of the disclosure.

In addition, the embodiments of the disclosure further provide a data processing chip. For example, the chip is installed in any computer device to implement a data processing function of the computer device. As shown in FIG. 19, a chip 1900 includes an instruction processing unit 1901, a data processing unit 1902, a data moving unit 1903, and a data cache unit 1904. The instruction processing unit 1901 is configured to read a parallel control instruction and simultaneously transmit the parallel control instruction to the data processing unit 1902 and the data moving unit 1903; the data processing unit 1902 is configured to read, according to the parallel control instruction, first data that has been cached in the data cache unit 1904, process the read first data, and output processed first data to the data cache unit; and the data moving unit 1903 is configured to move, according to the parallel control instruction, to-be-processed second data from a data storage unit located outside the chip to the data cache unit 1904, the second data being next data of the first data.

In an example embodiment, the parallel control instruction includes a data processing instruction and a data moving instruction. The instruction processing unit 1901 is configured to extract the data processing instruction and the data moving instruction in the parallel control instruction; the data processing unit 1902 is configured to read, according to the data processing instruction, the first data that has been cached in the data cache unit, process the read first data, and output the processed first data to the data cache unit; and the data moving unit 1903 is configured to move the second data from the data storage unit to the data cache unit according to the data moving instruction.

The instruction processing unit 1901 extracts the data processing instruction and the data moving instruction in the parallel control instruction, and this is implemented by extracting valid field indication information in the parallel control instruction. A first valid field and a second valid field in the parallel control instruction are determined according to the valid field indication information; and the first valid field and the second valid field are read from the parallel control instruction to obtain the data processing instruction and the data moving instruction. For example, the first valid field is read from the parallel control instruction to obtain the data processing instruction; and the second valid field is read from the parallel control instruction to obtain the data moving instruction.

As shown in FIG. 19, in an example embodiment, the chip further includes an instruction cache unit 1905. The instruction processing unit 1901 is configured to read parallel control instructions in the instruction storage unit located outside the chip; move the read parallel control instructions to the instruction cache unit 1905 according to a reading sequence for caching, to obtain an instruction cache queue; and read the parallel control instruction from the instruction cache queue according to an instruction cache sequence. The instruction cache queue is a queue located in the instruction cache unit 1905 and including at least one instruction.

After the data processing unit 1902 outputs processed data to the data cache unit, the data moving unit 1903 moves the data outputted to the data cache unit to the data storage unit located outside the chip. In an example embodiment, the data moving unit 1903 is configured to move processed third data from the data cache unit 1904 to the data storage unit outside the chip according to the parallel control instruction, the third data being previous data of the first data.

In an example embodiment, the data processing unit 1902 is configured to transmit a first completion message to the instruction processing unit 1901 after outputting the processed first data to the data cache unit 1904; the data moving unit 1903 is configured to transmit a second completion message to the instruction processing unit 1901 after moving the second data from the data storage unit outside the chip to the data cache unit 1904; the instruction processing unit 1901 is configured to simultaneously transmits a next parallel control instruction matching fourth data to the data processing unit 1902 and the data moving unit 1903 after receiving the first completion message and the second completion message, the fourth data being next data of the second data in the plurality of pieces of data.

Figure 20:
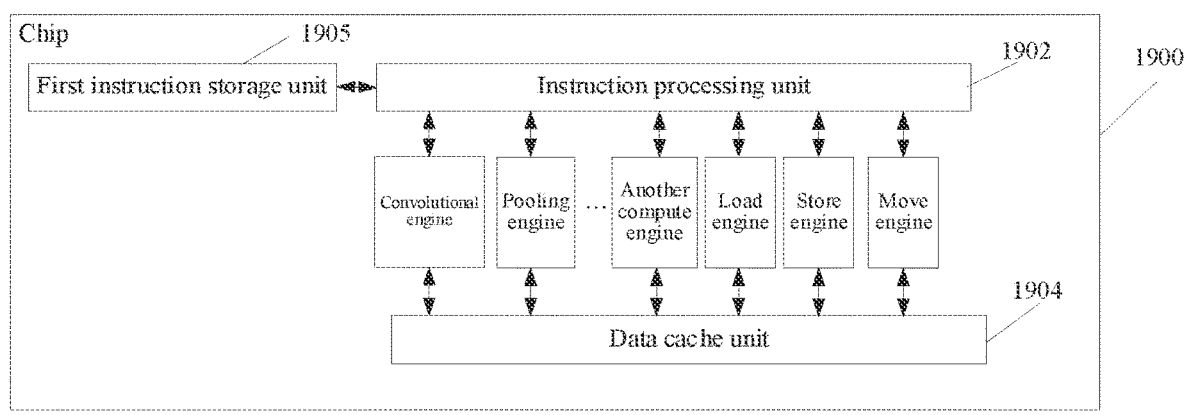
FIG. 20 is a schematic diagram of a chip according to an example embodiment of the disclosure.

In an example embodiment, as shown in FIG. 20, the chip 1900 is an AI chip, and the to-be-processed data is picture data. The data processing unit 1902 is configured to read, according to the parallel control instruction, the first data that has been cached in the data cache unit 1904; the data processing unit 1902 is further configured to process the first data based on a neural network model, and output the processed first data to the data storage unit, the data storage unit being any data storage unit located outside the AI chip.

The data processing unit 1902 includes a plurality of data processing subunits, and the data moving unit 1903 includes at least one of a load engine, a store engine, and a move engine. The load engine is configured to move the to-be-processed data from the data storage unit to the data cache unit; any data processing subunit is configured to read data that has been cached in the data cache unit, process the data, and output processed data to an output storage unit corresponding to the any data processing subunit; the move engine is configured to move data processed by data processing subunits other than the last data processing subunit in the plurality of data processing subunits from the output storage unit to an input storage unit corresponding to a next data processing subunit; and the store engine is configured to move data processed by the last data processing subunit from an output storage unit corresponding to the last data processing subunit to the data storage unit.

In an example embodiment, as shown in FIG. 20, the data processing unit 1902 includes at least one of a convolutional engine or a pooling engine.

Figure 21:
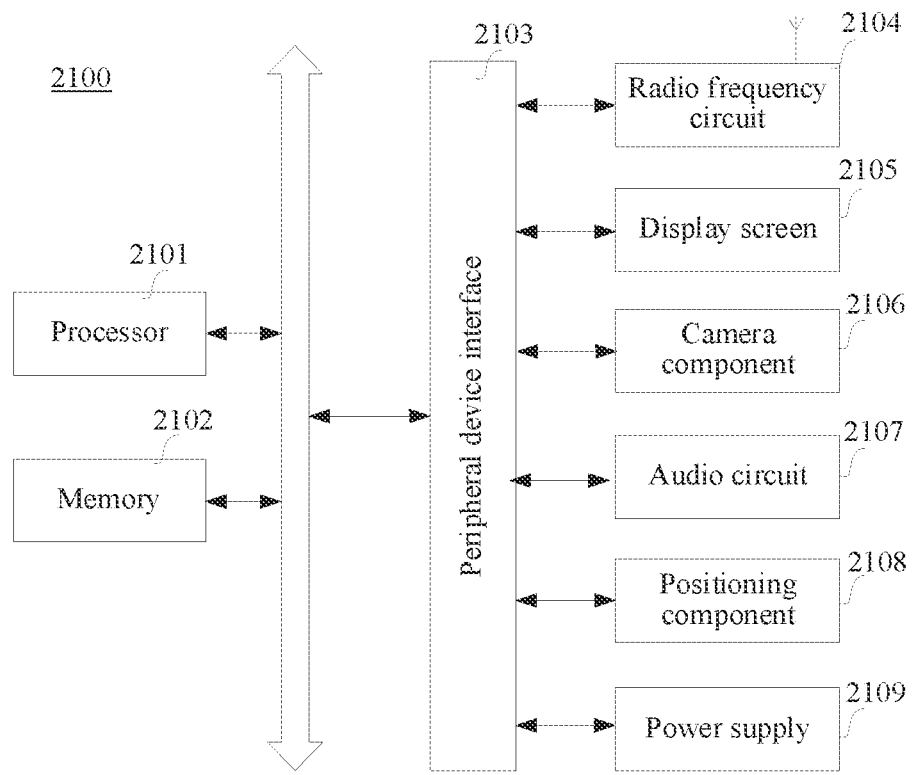
FIG. 21 is a structural block diagram of a terminal according to an example embodiment of the disclosure.

FIG. 21 is a structural block diagram of a terminal according to an embodiment of the disclosure. The terminal 2100 is configured to perform the steps performed by the terminal in the foregoing embodiments. For example, the terminal is a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 2100 may also be referred to as a user equipment, a portable terminal, a laptop terminal, a desktop terminal, or another name.

The terminal 2100 includes a processor 2101 and a memory 2102.

The processor 2101 includes one or more processing cores, for example, a 4-core processor or an 8-core processor. For example, the processor 2101 may be implemented in at least one hardware form of a digital signal processor (DSP), a field-programmable gate array (FPGA), and a programmable logic array (PLA). For example, the processor 2101 includes a main processor and a coprocessor. The main processor is a processor configured to process data in an awake state, and referred to as a central processing unit (CPU). The coprocessor is a low power consumption processor configured to process the data in a standby state. In some embodiments, the processor 2101 is integrated with a graphics processing unit (GPU). The GPU is configured to render and draw content that needs to be displayed on a display screen. In some embodiments, the processor 2101 further includes an artificial intelligence (AI) processor. The AI processor is configured to process computing operations related to machine learning.

The memory 2102 includes one or more computer-readable storage media. The computer-readable storage medium is non-transient. The memory 2102 may further include a high-speed random access memory and a non-volatile memory, for example, one or more disk storage devices or flash memory devices. In some embodiments, the non-transitory computer-readable storage medium in the memory 2102 is configured to store at least one program code, and the at least one program code is configured to be executed by the processor 2101 to implement the data processing method provided in the method embodiments of the disclosure.

In some embodiments, the terminal 2100 may for example include: a peripheral device interface 2103 and at least one peripheral device. The processor 2101, the memory 2102, and the peripheral device interface 2103 may be connected through a bus or a signal cable. Each peripheral device is connected to the peripheral device interface 2103 through a bus, a signal cable, or a circuit board. For example, the peripheral device includes: at least one of a radio frequency (RF) circuit 2104, a display screen 2105, a camera component 2106, an audio circuit 2107, a positioning component 2108, and a power supply 2109.

The peripheral device interface 2103 may be configured to connect at least one peripheral device related to input/output (I/O) to the processor 2101 and the memory 2102. In some embodiments, the processor 2101, the memory 2102, and the peripheral device interface 2103 are integrated on the same chip or circuit board. In some other embodiments, any one or two of the processor 2101, the memory 2102, and the peripheral device interface 2103 may be implemented on a separate chip or circuit board. This is not limited in this embodiment of the disclosure.

The RF circuit 2104 is configured to receive and transmit an RF signal, which is also referred to as an electromagnetic signal. The RF circuit 2104 communicates with a communication network and other communication devices through the electromagnetic signal. The RF circuit 2104 converts an electric signal into an electromagnetic signal for transmission, or converts a received electromagnetic signal into an electric signal. For example, the RF circuit 2104 includes: an antenna system, an RF transceiver, one or more amplifiers, a tuner, an oscillator, a digital signal processor, a codec chip set, a subscriber identity module card, and the like. The RF circuit 2104 may, communicate with another terminal by using at least one wireless communication protocol. The wireless communication protocol includes, but is not limited to: a world wide web, a metropolitan area network, an intranet, generations of mobile communication networks (2G, 3G, 4G, and 5G), a wireless local area network, and/or a wireless fidelity (Wi-Fi) network. In some embodiments, the RF circuit 2104 further includes a circuit related to near field communication (NFC), which is not limited in the disclosure.

The display screen 2105 is configured to display a user interface (UI). The UI include a graph, a text, an icon, a video, and any combination thereof. When the display screen 2105 is a touch display screen, the display screen 2105 also has a capability to collect a touch signal on or above a surface of the display screen 2105. The touch signal may be inputted to the processor 2101 for processing as a control signal. In this case, the display screen 2105 is further configured to provide a virtual button and/or a virtual keyboard, which is also referred to as a soft button and/or a soft keyboard. In some embodiments, there is one display screen 2105, disposed on a front panel of the terminal 2100. In some other embodiments, there are at least two display screens 2105, respectively disposed on different surfaces of the terminal 2100 or designed in a foldable shape. In still some other embodiments, the display screen 2105 may be a flexible display screen, disposed on a curved surface or a folded surface of the terminal 2100. Even, the display screen 2105 is set in a non-rectangular irregular pattern, namely, a special-shaped screen. The display screen 2105 is manufactured by using a material such as a liquid crystal display (LCD) or an organic light-emitting diode (OLED).

The camera component 2106 is configured to collect an image or a video. For example, the camera component 2106 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 2106 further include a flashlight. For example, the flashlight is a single color temperature flash or a double color temperature flash. The double color temperature flashlight refers to a combination of a warm flashlight and a cold flashlight, and is used for light compensation at different color temperatures.

The audio circuit 2107 may include a microphone and a speaker. The microphone is configured to collect sound waves of users and surroundings, and convert the sound waves into electrical signals and input the signals to the processor 2101 for processing, or input the signals to the RF circuit 2104 to implement voice communication. For a purpose of stereo collection or noise reduction, there may be a plurality of microphones disposed at different portions of the terminal 2100 respectively. For example, the microphone is an array microphone or an omnidirectional acquisition microphone. The speaker is configured to convert electric signals from the processor 2101 or the RF circuit 2104 into sound waves. For example, the speaker is a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging or other uses. In some embodiments, the audio circuit 2107 also includes an earphone jack.

The positioning component 2108 is configured to determine a current geographic location of the terminal 2100, to implement navigation or a location-based service (LBS). The positioning component 2108 may be a positioning component based on the global positioning system (GPS) of the United States, the BeiDou system of China, the GLONASS system of Russia, or the GALILEO system of the European Union.

The power supply 2109 is configured to supply power to components in the terminal 2100, the power supply 2109 is an alternating current, a direct current, a disposable battery, or a rechargeable battery. When the power supply 2109 includes a rechargeable battery, the rechargeable battery is a wired rechargeable battery or a wireless rechargeable battery. The rechargeable battery is further configured to support a quick charge technology.

A person skilled in the art may understand that the structure shown in FIG. 21 constitutes no limitation on the terminal 2100, and the terminal may include more or fewer components than those shown in the figure, or some components may be combined, or a different component deployment may be used.

Figure 22:
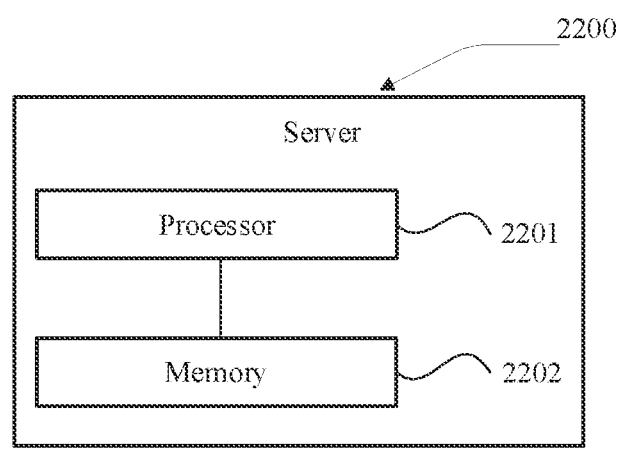
FIG. 22 is a schematic structural diagram of a server according to an example embodiment of the disclosure.

FIG. 22 is a schematic structural diagram of a server according to an embodiment of the disclosure. The server 2200 may vary greatly due to different configurations or performance, and may include one or more processors (CPUs) 2201 and one or more memories 2202. The memory 2202 stores at least one program code, the at least one program code being loaded and executed by the one or more processors 2201 to implement the method provided in the foregoing method embodiments. Certainly, the server may further have a wired or wireless network interface, a keyboard, an I/O interface and other components to facilitate I/O. The server may further include other components for implementing device functions. Details are not described herein again.

The server 2200 may be configured to perform the steps performed by the server in the foregoing data processing method.

An embodiment of the disclosure further provides a computer device, including a processor and a memory, the memory storing at least one program code, the program code being loaded and executed by the processor to implement operations performed in the data processing method in the foregoing embodiments.

For example, in an example embodiment, the computer device includes: a processor and a data storage unit, the processor including: an instruction processing unit, a data processing unit, a data moving unit, and a data cache unit.

The instruction processing unit is configured to read a parallel control instruction.

The data processing unit is configured to read, according to the parallel control instruction, first data that has been cached in the data cache unit, process the read first data, and output processed first data to the data cache unit.

The data moving unit is configured to simultaneously move second data from the data storage unit to the data cache unit according to the parallel control instruction, the second data being next data of the first data.

In an example embodiment, the computer device includes an instruction storage unit, and the processor includes an instruction cache unit. The instruction processing unit is configured to read parallel control instructions in the instruction storage unit; move the read parallel control instructions to the instruction cache unit according to a reading sequence for caching, to obtain an instruction cache queue; and read the parallel control instruction from the instruction cache queue according to an instruction cache sequence.

In an example embodiment, the parallel control instruction includes a data processing instruction and a data moving instruction; and the instruction processing unit is configured to extract the data processing instruction and the data moving instruction in the parallel control instruction.

The instruction processing unit is further configured to transmit the data processing instruction to the data processing unit and simultaneously transmit the data moving instruction to the data moving unit.

The data processing unit is configured to read, according to the data processing instruction, the first data that has been cached in the data cache unit, process the read first data, and output the processed first data to the data cache unit.

The data moving unit is configured to move the second data from the data storage unit to the data cache unit according to the data moving instruction.

In an example embodiment, the instruction processing unit is configured to extract valid field indication information in the parallel control instruction, and determine a first valid field and a second valid field in the parallel control instruction according to the valid field indication information; and read the first valid field in the parallel control instruction, to obtain the data processing instruction, and read the second valid field in the parallel control instruction, to obtain the data moving instruction.

In an example embodiment, the computer device further includes a splitting unit, the splitting unit being configured to obtain to-be-processed data; split the to-be-processed data according to a cache capacity of the data cache unit, to obtain a plurality of pieces of split data; and store a data sequence formed by the plurality of pieces of data in the data storage unit.

In an example embodiment, the to-be-processed data is picture data; and the data processing unit is configured to read, according to the parallel control instruction based on a neural network model, the first data that has been cached in the data cache unit; and process the read first data, and output the processed first data to the data cache unit.

In an example embodiment, the data processing unit is configured to perform data processing in parallel according to a data processing instruction corresponding to each layer in the neural network model.

In an example embodiment, the neural network model includes a convolutional layer and a pooling layer, and the data processing unit is configured to receive a data processing instruction corresponding to the convolutional layer and a data processing instruction corresponding to the pooling layer:

read, according to the data processing instruction corresponding to the convolutional layer based on the convolutional layer, the first data that has been cached in the data cache unit, perform convolution processing on the first data, and output the first data after the convolution processing to the data cache unit; and simultaneously read, according to the data processing instruction corresponding to the pooling layer based on the pooling layer, third data after the convolution processing that has been cached in the data cache unit, perform pooling processing on the third data after the convolution processing, and output the third data after the pooling processing to the data cache unit, the third data being previous data of the first data in the plurality of pieces of data.

A person of ordinary skill would understand that these "units" in the foregoing embodiments could be implemented by hardware logic, computer software code, or a combination of both.

The embodiments of the disclosure further provide a computer-readable storage medium, storing at least one program code, the at least one program code being loaded and executed by a processor, to implement the following operations:

reading a parallel control instruction;

reading, according to the parallel control instruction, first data that has been cached in a data cache space, processing the read first data, and outputting processed first data to the data cache space; and simultaneously moving second data from the data storage space to the data cache space according to the parallel control instruction, the second data being next data of the first data.

In an example embodiment, the at least one program code is loaded and executed by the processor to implement follows operations:

reading parallel control instructions in an instruction storage space;

moving the read parallel control instructions to an instruction cache space according to a reading sequence for caching, to obtain an instruction cache queue; and reading the parallel control instruction from the instruction cache queue according to an instruction cache sequence.

In an example embodiment, the parallel control instruction includes a data processing instruction and a data moving instruction; and the at least one program code is loaded and executed by the processor to implement follows operations:

extracting the data processing instruction and the data moving instruction in the parallel control instruction;

reading, according to the data processing instruction, the first data that has been cached in the data cache space, processing the read first data, and outputting the processed first data to the data cache space; and moving the second data from the data storage space to the data cache space according to the data moving instruction.

In an example embodiment, the at least one program code is loaded and executed by the processor to implement follows operations:

extracting valid field indication information in the parallel control instruction;

determining a first valid field and a second valid field in the parallel control instruction according to the valid field indication information; and reading the first valid field from the parallel control instruction to obtain the data processing instruction; and reading the second valid field from the parallel control instruction to obtain the data moving instruction.

In an example embodiment, the at least one program code is loaded and executed by the processor to implement follows operations:

obtaining to-be-processed data;

splitting the to-be-processed data according to a cache capacity of the data cache space, to obtain a plurality of pieces of split data; and storing a data sequence formed by the plurality of pieces of data in the data storage space.

In an example embodiment, the to-be-processed data is picture data; and the at least one program code is loaded and executed by the processor to implement follows operations:

reading, according to the parallel control instruction based on a neural network model, the first data that has been cached in the data cache space; processing the read first data, and outputting the processed first data to the data cache space.

In an example embodiment, the at least one program code is loaded and executed by the processor to implement follows operations:

performing data processing in parallel according to a data processing instruction corresponding to each layer in the neural network model.

In an example embodiment, the neural network model includes a convolutional layer and a pooling layer, and the at least one program code is loaded and executed by the processor to implement follows operations:

receiving a data processing instruction corresponding to the convolutional layer and a data processing instruction corresponding to the pooling layer;

reading, according to the data processing instruction corresponding to the convolutional layer based on the convolutional layer, the first data that has been cached in the data cache unit, performing convolution processing on the first data, and outputting the first data after the convolution processing to the data cache space; and simultaneously reading, according to the data processing instruction corresponding to the pooling layer based on the pooling layer, third data after the convolution processing that has been cached in the data cache unit, performing pooling processing on the third data after the convolution processing, and outputting the third data after the pooling processing to the data cache unit, the third data being previous data of the first data in the plurality of pieces of data.

The embodiments of the disclosure further provide a computer program, storing at least one program code, the at least one program code being loaded and executed by a processor, to implement the following operations:

reading a parallel control instruction;

reading, according to the parallel control instruction, first data that has been cached in a data cache space, processing the read first data, and outputting processed first data to the data cache space; and simultaneously moving second data from the data storage space to the data cache space according to the parallel control instruction, the second data being next data of the first data.

In an example embodiment, the at least one program code is loaded and executed by the processor to implement follows operations:

reading parallel control instructions in an instruction storage space;

moving the read parallel control instructions to an instruction cache space according to a reading sequence for caching, to obtain an instruction cache queue; and reading the parallel control instruction from the instruction cache queue according to an instruction cache sequence.

In an example embodiment, the parallel control instruction includes a data processing instruction and a data moving instruction; and the at least one program code is loaded and executed by the processor to implement follows operations:

extracting the data processing instruction and the data moving instruction in the parallel control instruction;

the reading, according to the parallel control instruction, first data that has been cached in a data cache space, processing the read first data, and outputting processed first data to the data cache space includes:

reading, according to the data processing instruction, the first data that has been cached in the data cache space, processing the read first data, and outputting the processed first data to the data cache space; and the moving second data from a data storage space to the data cache space according to the parallel control instruction includes:

moving the second data from the data storage space to the data cache space according to the data moving instruction.

In an example embodiment, the at least one program code is loaded and executed by the processor to implement follows operations:

extracting valid field indication information in the parallel control instruction;

determining a first valid field and a second valid field in the parallel control instruction according to the valid field indication information; and reading the first valid field from the parallel control instruction to obtain the data processing instruction; and reading the second valid field from the parallel control instruction to obtain the data moving instruction.

In an example embodiment, the at least one program code is loaded and executed by the processor to implement follows operations:

obtaining to-be-processed data;

splitting the to-be-processed data according to a cache capacity of the data cache space, to obtain a plurality of pieces of split data and storing a data sequence formed by the plurality of pieces of data in the data storage space.

In an example embodiment, the to-be-processed data is picture data; and the at least one program code is loaded and executed by the processor to implement follows operations:

reading, according to the parallel control instruction based on a neural network model, the first data that has been cached in the data cache space; processing the read first data, and outputting the processed first data to the data cache space.

In an example embodiment, the at least one program code is loaded and executed by the processor to implement follows operations:

performing data processing in parallel according to a data processing instruction corresponding to each layer in the neural network model.

In an example embodiment, the at least one program code is loaded and executed by the processor to implement follows operations:

receiving a data processing instruction corresponding to the convolutional layer and a data processing instruction corresponding to the pooling layer;

reading, according to the data processing instruction corresponding to the convolutional layer based on the convolutional layer, the first data that has been cached in the data cache unit, performing convolution processing on the first data, and outputting the first data after the convolution processing to the data cache space; and simultaneously reading, according to the data processing instruction corresponding to the pooling layer based on the pooling layer, third data after the convolution processing that has been cached in the data cache unit, performing pooling processing on the third data after the convolution processing, and outputting the third data after the pooling processing to the data cache unit, the third data being previous data of the first data in the plurality of pieces of data.

A person of ordinary skill in the art can understand that all or some of the steps of the foregoing embodiments may be implemented by hardware, or can be implemented a program instructing related hardware. The program may be stored in a computer-readable storage medium. The storage medium may be: a ROM, a magnetic disk, or an optical disc.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. A data processing method, performed by a computer device, the method comprising:

reading parallel control code;

reading, as instructed by the parallel control code, first data that has been cached in a data cache space, processing the read first data, and outputting processed first data to the data cache space; and simultaneously, with processing the read first data, moving second data from a data storage space to the data cache space as instructed by the parallel control code, the second data being next data of the first data;

simultaneously, with processing the second data, moving third data from the data storage space to the data cache space as instructed by the parallel control code, the third data being next data of the second data, and, while moving the third data from the data storage space to the data cache space, outputting the processed first data to the data cache space;

reading, according to a data processing code corresponding to a convolutional layer based on the convolutional layer, the first data that has been cached in the data cache space, performing convolution processing on the first data, and outputting the first data after the convolution processing to the data cache space; and simultaneously, with reading the first data according to the data processing code corresponding to the convolutional layer, reading, according to a data processing code corresponding to a pooling layer based on the pooling layer, the third data after the convolution processing that has been cached in the data cache space, performing pooling processing on the third data after the convolution processing, and outputting the third data after the pooling processing to the data cache space, the third data being previous data of the first data in the plurality of pieces of data.

2. The method according to claim 1, wherein the reading parallel control code comprises:

reading parallel control code in an instruction storage space;

moving the read parallel control code to an instruction cache space according to a reading sequence for caching, to obtain an instruction cache queue; and reading the parallel control code from the instruction cache queue according to an instruction cache sequence.

3. The method according to claim 1, wherein the parallel control code comprises data processing code and data moving code;
- after the reading the parallel control code, the method further comprises:
- extracting the data processing code and the data moving code in the parallel control code;
- the reading, according to the parallel control code, first data that has been cached in a data cache space, processing the read first data, and outputting processed first data to the data cache space comprises:
- reading, according to the data processing code, the first data that has been cached in the data cache space, processing the read first data, and outputting the processed first data to the data cache space; and
- the moving second data from a data storage space to the data cache space according to the parallel control code comprises:
- moving the second data from the data storage space to the data cache space according to the data moving code.

4. The method according to claim 3, wherein the extracting comprises:
- extracting valid field indication information in the parallel control code;
- determining a first valid field and a second valid field in the parallel control code according to the valid field indication information; and
- reading the first valid field in the parallel control code, to obtain the data processing code, and reading the second valid field in the parallel control code, to obtain the data moving code.

5. The method according to claim 1, further comprising:
obtaining to-be-processed data;
- splitting the to-be-processed data according to a cache capacity of the data cache space, to obtain a plurality of pieces of split data; and
- storing a data sequence formed by the plurality of pieces of data in the data storage space.

6. The method according to claim 5, wherein the to-be-processed data is picture data; and the reading, according to the parallel control code, first data that has been cached in a data cache space, processing the read first data, and outputting processed first data to the data cache space comprises:
- reading, according to the parallel control code based on a neural network model, the first data that has been cached in the data cache space, processing the read first data, and outputting the processed first data to the data cache space.

7. The method according to claim 6, further comprising:
performing data processing in parallel according to a processing code corresponding to each layer in the neural network model.

8. The method according to claim 7, wherein the neural network model comprises the convolutional layer and the pooling layer; and the performing comprises:
- receiving the data processing code corresponding to the convolutional layer and the data processing code corresponding to the pooling layer.

9. A computer device, comprising:
at least one memory configured to store program code;
at least one data storage;
at least one data cache;
at least one processor configured to access the program code and operate as instructed by the program code, the program code including:
- instruction processing code configured to cause the at least one processor to read a parallel control code;
- data processing code configured to cause the at least one processor to read, according to the parallel control code, first data that has been cached in the data cache, process the read first data, and output processed first data to the data cache;
- data moving code configured to cause the at least one processor to simultaneously, with processing the read first data, move second data from the data storage to the data cache according to the parallel control code, the second data being next data of the first data, and
- wherein the instruction processing code is further configured to cause the at least one processor to:
- simultaneously, with processing the second data, move third data from the data storage space to the data cache space as instructed by the parallel control code, the third data being next data of the second data, and, while moving the third data from the data storage space to the data cache space, outputting the processed first data to the data cache space;
- reading, according to a data processing code corresponding to a convolutional layer based on the convolutional layer, the first data that has been cached in the data cache space, performing convolution processing on the first data, and outputting the first data after the convolution processing to the data cache space; and
- simultaneously, with reading the first data according to the data processing code corresponding to the convolutional layer, reading, according to a data processing code corresponding to a pooling layer based on the pooling layer, the third data after the convolution processing that has been cached in the data cache space, performing pooling processing on the third data after the convolution processing, and outputting the third data after the pooling processing to the data cache space, the third data being previous data of the first data in the plurality of pieces of data.

10. The device according to claim 9, wherein the instruction processing code is configured to cause the at least one processor to:
- read parallel control code in an instruction storage;
- move the read parallel control code to an instruction cache according to a reading sequence for caching, to obtain an instruction cache queue; and
- read the parallel control code from the instruction cache queue according to an instruction cache sequence.

11. The device according to claim 9, wherein the program code is further configured to cause the at least one processor to:
- extract the data processing code and the data moving code in the parallel control code;
- the data processing code is further configured to cause the at least one processor to:
- read, according to the data processing code, the first data that has been cached in the data cache, process the read first data, and output the processed first data to the data cache; and
- the data moving code is further configured to cause the at least one processor to:
- move the second data from the data storage to the data cache according to the data moving code.

12. The device according to claim 11, wherein the extracting comprises:

extracting valid field indication information in the parallel control code;
determining a first valid field and a second valid field in the parallel control code according to the valid field indication information; and
reading the first valid field in the parallel control code, to obtain the data processing code, and reading the second valid field in the parallel control code, to obtain the data moving code.

13. The device according to claim 9, wherein the program code is further configured to cause the at least one processor to:
obtain to-be-processed data;
split the to-be-processed data according to a cache capacity of the data cache, to obtain a plurality of pieces of split data; and
store a data sequence formed by the plurality of pieces of data in the data storage.

14. The device according to claim 13, wherein the to-be-processed data is picture data; and the data processing code is further configured to cause the at least one processor to:
read, according to the parallel control code based on a neural network model, the first data that has been cached in the data cache, process the read first data, and output the processed first data to the data cache.

15. The device according to claim 14, wherein the program code is further configured to cause the at least one processor to:
perform data processing in parallel according to a processing code corresponding to each layer in the neural network model.

16. The device according to claim 15, wherein the neural network model comprises the convolutional layer and the pooling layer, and the program code is further configured to cause the at least one processor to:
receive the data processing code corresponding to the convolutional layer and the data processing code corresponding to the pooling layer.

17. A non-volatile computer-readable storage medium, storing computer code that when executed by at least one processor causes the at least one processor to:
read parallel control code;
read, according to the parallel control code, first data that has been cached in a data cache, process the read first data, and output processed first data to the data cache;
simultaneously, with processing the read first data, move second data from a data storage to the data cache according to the parallel control code, the second data being next data of the first data; and
simultaneously, with processing the second data, move third data from the data storage space to the data cache space as instructed by the parallel control code, the third data being next data of the second data, and, while moving the third data from the data storage space to the data cache space, outputting the processed first data to the data cache space;
reading, according to a data processing code corresponding to a convolutional layer based on the convolutional layer, the first data that has been cached in the data cache space, performing convolution processing on the first data, and outputting the first data after the convolution processing to the data cache space; and
simultaneously, with reading the first data according to the data processing code corresponding to the convolutional layer, reading, according to a data processing code corresponding to a pooling layer based on the pooling layer, the third data after the convolution processing that has been cached in the data cache space, performing pooling processing on the third data after the convolution processing, and outputting the third data after the pooling processing to the data cache space, the third data being previous data of the first data in the plurality of pieces of data.

18. The storage medium according to claim 17, wherein the reading parallel control code is further configured to cause the at least one processor to:
read parallel control code in an instruction storage;
move the read parallel control code to an instruction cache according to a reading sequence for caching, to obtain an instruction cache queue; and
read the parallel control code from the instruction cache queue according to an instruction cache sequence.

19. The memory storage medium according to claim 17, wherein the parallel control code includes data processing code and data moving code; and
after reading the parallel control code, the computer code causes the at least one processor to:
extract the data processing code and the data moving code in the parallel control code;
wherein the read, according to the parallel control code, first data that has been cached in a data cache, process the read first data, and output processed first data to the data cache comprises:
reading, according to the data processing code, the first data that has been cached in the data cache, processing the read first data, and outputting the processed first data to the data cache; and
wherein the moving of the second data from a data storage to the data cache according to the parallel control code comprises:
moving the second data from the data storage to the data cache according to the data moving code.

20. The memory storage medium according to claim 17, wherein the computer code is further configured to cause the at least one processor to:
obtain to-be-processed data;
split the to-be-processed data according to a cache capacity of the data cache, to obtain a plurality of pieces of split data; and
store a data sequence formed by the plurality of pieces of data in the data storage.

* * * * *